(12) United States Patent
Kim et al.

(10) Patent No.: US 7,591,927 B2
(45) Date of Patent: Sep. 22, 2009

(54) MANUFACTURING METHOD FOR WASTEPAPER SHOCK ABSORBING MATERIALS USING VACUUM FORMING PRINCIPLE AND WASTEPAPER SHOCK ABSORBING MATERIALS USING THE METHOD

(75) Inventors: Chul hwan Kim, Gyeongsangnam-do (KR); Young min Lee, Gyeongsangnam-do (KR); Dae bin Song, Gyeongsangnam-do (KR)

(73) Assignee: Industry-Academic Cooperation Foundation Gyeongsang National University, Gyeongsangnam-Do (KR)

( * ) Notice: Subject to any disclaimer, the term of this patent is extended or adjusted under 35 U.S.C. 154(b) by 402 days.

(21) Appl. No.: 11/565,875

(22) Filed: Dec. 1, 2006

(65) Prior Publication Data

US 2007/0227680 A1     Oct. 4, 2007

(30) Foreign Application Priority Data

Apr. 3, 2006    (KR) .................. 10-2006-0030201

(51) Int. Cl.
*D21F 13/00*    (2006.01)

(52) U.S. Cl. .................. 162/218; 162/165; 162/147; 162/221; 162/227

(58) Field of Classification Search .............. 162/218, 162/165, 147, 221, 227
See application file for complete search history.

(56) References Cited

FOREIGN PATENT DOCUMENTS

WO       WO 02/088468      * 11/2002

* cited by examiner

*Primary Examiner*—Mark Halpern
(74) *Attorney, Agent, or Firm*—Lee, Hong, Degerman, Kang & Waimey

(57) ABSTRACT

A method for manufacturing a wastepaper shock absorbing material using a vacuum forming principle is provided. The method includes disintegrating wastepaper selected from at least one of old corrugated containers, old newspapers and milk cartons, diluting the disintegrated wastepaper to form a pulp suspension, mixing the pulp suspension with a cationic starch to form a mixture, and vacuuming the mixture by applying a first vacuum in a first direction and a second vacuum in a second direction in a vacuum former to vacuum-dehydrate the mixture and provide a shock absorbing material. The first direction is substantially opposite to the second direction. The method further includes drying the shock absorbing material and performing a surface sizing process on a surface of the shock absorbing material. The wastepaper shock absorbing material has a low elastic modulus and density and can be manufactured without using the conventional press process performed by a press plate.

15 Claims, 22 Drawing Sheets

(KONP)  (KOCC)  (MILK CARTON)

RECTANGULAR SHOCK ABSORBING MATERIAL FORMING BOX
OF A VACUUM FORMER (a) (b)

(a) KOCC + MILK CARTON (b) KONP + MILK CARTON (a) KOCC + MILK CARTON (b) KONP + MILK CARTON (a) KOCC (b) KONP (a) KOCC (b) KONP

MANUFACTURING METHOD FOR WASTEPAPER SHOCK ABSORBING MATERIALS USING VACUUM FORMING PRINCIPLE AND WASTEPAPER SHOCK ABSORBING MATERIALS USING THE METHOD

CLAIM FOR PRIORITY

This application is based on and claims priority to Korean Patent Application No. 10-2006-0030201 filed on Apr. 3, 2006 in the Korean Intellectual Property Office (KIPO), the entire contents of which are hereby incorporated by reference

BACKGROUND

The present invention relates to a method for manufacturing shock absorbing materials using wastepaper, and particularly to a manufacturing method for wastepaper shock absorbing materials using vacuum forming principle and wastepaper shock absorbing materials using the method. More particularly, the present invention relates to a method for manufacturing shock absorbing materials by vacuum-dehydrating pulp suspension mixed with cationic starch to a dual direction using a vacuum former capable of dual vacuuming process.

Typical shock absorbing (cushion) materials currently on the market include, but not limited to, Styrofoam, pulp mold, polypropylene and polyethylene. All these materials, excluding the pulp mold, have come to be regarded as non-degradable (water-non-dispersible, water-non-soluble, and/or water-non-biogradable) packing materials that hardly solve in the natural environment. The Styrofoam is called in various names such as foam polystyrene, Styrofoam, expanded styrene, Styropor and the like. The Styropor is a trademark of a German chemical conglomerate BASF AG., and the Styrofoam is an insulating material trademark of Dow Chemical of USA, which is widely known as Styropor in Korea. The Styrofoam is a product manufactured by infusing hydrocarbon gas such as pentane or butane into polystyrene resin, which is then blown or expanded by vapor. The Styrofoam is a natural resource-conserving material mainly composed of air (98%) and resin (2%) as remainder.

Due to widespread environmental concerns and drawbacks that the aforementioned non-degradable packing materials are made from fossil raw materials, and difficult to solve in natural conditions, movements have strongly arisen in developed countries to discontinue use of and prohibit Styrofoam. Problem awareness of environmental pollution caused by packing materials has exerted a direct influence on environmental restriction in respective countries and on international trades as well.

The European Union (EU) promulgated a "packages and packaging wastes directive" for promoting reduction and recycling of packaging wastes, whereby member states are required to collect 50-60% and recycle 25-45% of packaging wastes, and to reduce minimum 15% of reusable products per material by 2001. A directive under implementation requires the member states to prohibit use of materials containing environmentally hazardous substances including Hg and Pb in relation to export packages for electric home appliances, remove and reuse 50% of a gross weight of generated packaging wastes, and to recycle 25% or more.

Such developed countries including the USA, Swiss, Sweden and Italy restrict use of Styrofoam containers and PVC packing materials, and Germany, France and Sweden have started to implement a compliance with so-called "Extended Producer Responsibility" environmental regulations in which manufacturers, distributors and importers are responsible for removing packing materials after consumption thereof. Particularly, a packaging regulation in Germany requires manufacturers or retailers to present a removal target for each period over three stages including transportation packages, secondary packages and sales packages. The regulation has achieved a remarkable result in reducing or curbing use of environmentally hazardous materials. The first stage has made it a duty for the manufacturers and sellers to remove transportation packages, and the second stage calls for retailers to remove secondary packages additionally wrapped on merchandise wrappings for advertisement or theft prevention purpose. At this time, retailers are requested to install a collection box near retailer shops. The third and last stage requires retailer shops to collect or remove merchandise wrappings at sales points. As the regulations are beefed up against using hardly-soluble packing materials, demands for environment-friendly packing materials are expected to increase rapidly, such that it is anticipated that demands for shock absorbing materials made of wastepaper fibers will increase at a great speed.

Recently, shock absorbing materials manufactured by using wastepaper fibers are produced in the name of pulp mold, and used as substitutes for packaging Styrofoam.

Referring to FIG. 1, the pulp mold was first used for egg cases, and thereafter widely used for industrial and consumer product wrappings. A pulp mold manufactured by a pulp mold manufacturing apparatus (FIG. 2) may be a pulp molded goods (articles) made by pouring wastepaper suspension into a forming box, and an excessive amount of water contained in the suspension being pressed, vacuum-dehydrated to one direction and dried.

The pulp mold itself thus manufactured, being composed of very dense fibrous structure (FIG. 3), has no shock absorbing ability, such that the pulp mold is provided by a separate mold with a free space to enable to prevent external shock (impact) or vibration from being directly transmitted thereto.

Another drawback is that the shock absorbing ability can hardly be retained unless moisture contents of shock absorbing materials are kept at a predetermined level or more because of characteristic of manufacturing method thereof in which wastepaper fibers are blown or expanded, and starch used as expanding supplementary agents.

SUMMARY

The present invention is directed to solve the aforementioned drawbacks and it is an object of the present invention to provide a manufacturing method for wastepaper shock absorbing materials using a vacuum forming principle and wastepaper shock absorbing materials using the method, including processes for manufacturing the shock absorbing materials using a vacuum former capable of dual-vacuuming a pulp suspension mixed with cationic starch to a dual direction.

According to the present invention, a shock absorbing material having a remarkably low elastic modulus and density can be effectively manufactured without recourse to the conventional press process by a press plate.

The manufacturing principle of shock absorbing materials according to the present invention has a striking difference from that of the conventional pulp mold manufacturing method in that there is no need of press process by a hot press plate after inputting a wastepaper suspension into a forming box. It is an object of the present invention to vacuum-dehydrate a pulp suspension to a dual direction, thereby enabling the shock absorbing material to have a large bulky structure (a state of low density). It is because, once water is removed from an inner structure of the shock absorbing material through the dual vacuuming, structures of the dually directed, vacuum-dehydrated shock absorbing materials can limit an occurrence of interfiber bonds to a maximum, thereby enabling to obtain a large number of voids therein. Because regions where the interfiber bonds are limited are to form a fiber network, these regions remain to be a large number of small voids inside the structure of the shock absorbing materials, which in turn makes physical properties excellent, the physical properties including a drying rate, a brightness, an apparent density, a compressive strength, a restoring ratio, an elastic modulus and a porosity, by which external shock, vibration or noise can be effectively absorbed.

In accordance with the object of the present invention, a method for manufacturing wastepaper shock absorbing material using a vacuum forming principle comprises the steps of: disintegrating wastepaper selected from at least one or more of Korea Old Corrugated Containers (KOCC), Korea Old Newspaper (KONP) and milk cartons, using a blender; diluting the disintegrated wastepaper to manufacture a pulp suspension; mixing the pulp suspension with cationic starch; vacuum-dehydrating the pulp suspension mixed with the cationic starch to a dual direction using a vacuum former capable of dual vacuuming to manufacture a shock absorbing material; drying the shock absorbing material; and performing a surface sizing process on a surface of the dried shock absorbing material.

Preferably, the cationic starch is the one gelatinized within a temperature range of 80° C. to 85° C. and diluted by 1%.

Furthermore, the vacuum former comprises a rectangular shock absorbing material forming box, a circular shock absorbing material forming tube, a vacuum pump for drainage, a control box and a drainage apparatus.

The vacuum dehydration may be performed within a time frame of 10 to 60 seconds, the wastepaper specimen may be added by milk carton specimen within a scope of 20% to 80%, the cationic starch being added to or mixed with the wastepaper may be within 4% to 5% of a total dry weight of the wastepaper, or the KOCC or KONP is the one recycled at least one or more times.

The shock absorbing material has been manufactured by the method for manufacturing a wastepaper shock absorbing material using a vacuum forming principle thus described, and the wastepaper shock absorbing material may be the one having an elastic modulus in the range of 150 kPa to 700 kPa, a density in the range of 0.12 g/cm$^3$ to 0.17 g/cm$^3$.

DETAILED DESCRIPTION

Now, in order to more specifically explain the present invention, exemplary embodiments of the present invention will be described with reference to the accompanying drawings. However, the present invention is not limited to the exemplary embodiments described below, but may be embodied in a variety of forms. In the following description, for purposes of explanation and not limitation, specific details are set forth such as particular compositions, processes, techniques, etc., in order to provide a thorough understanding of the present invention. However, it will be apparent to those skilled in the art that the present invention may be practiced in other embodiments that depart from these specific details. In other instances, detailed descriptions of well-known ingredients, steps, or operations are omitted so as not to obscure the description of the present invention with unnecessary detail. It is therefore to be understood by those skilled in the art that the invention is not limited to the disclosed embodiments, but, on the contrary, is intended to cover various modifications included within the spirit and scope of the appended claims and equivalents thereof.

Figure 4:
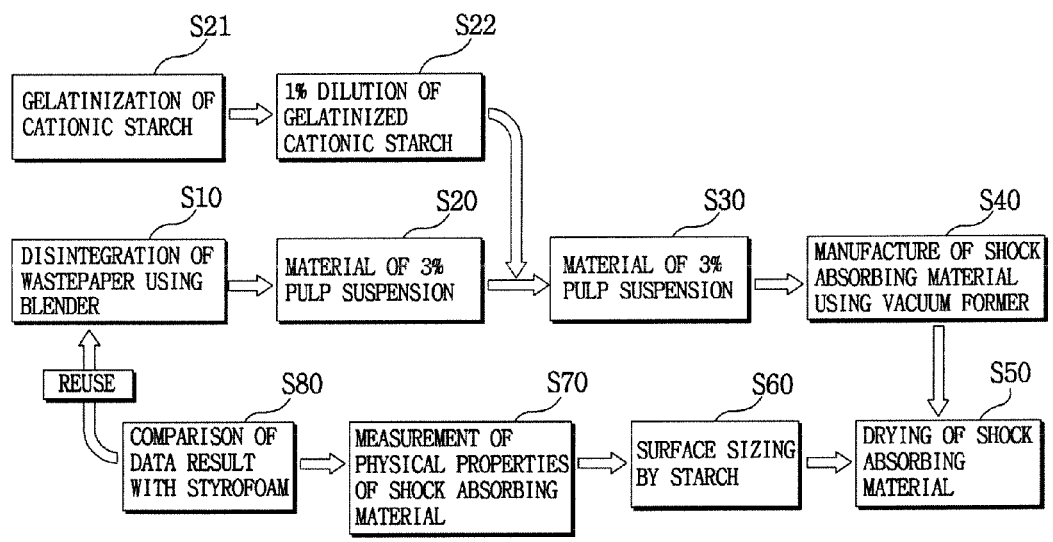
FIG. 4 is a flowchart illustrating a manufacturing method of wastepaper shock absorbing materials using a vacuum forming principle according to one embodiment of the present invention.

FIG. 4 is a flowchart illustrating a manufacturing method of wastepaper shock absorbing material using a vacuum forming principle according to one embodiment of the present invention.

A method for manufacturing a wastepaper shock absorbing material using a vacuum forming principle according to the present invention comprises the steps of: disintegrating wastepaper selected from at least one or more of Korea Old Corrugated Containers (KOCC), Korea Old Newspaper (KONP) and milk cartons, using a blender (S10); diluting the disintegrated wastepaper to manufacture pulp suspension (S20); mixing the pulp suspension with cationic starch (S30); vacuum-dehydrating the pulp cationic starch mixed with the pulp suspension to a dual direction using a vacuum former capable of dual vacuuming to manufacture a shock absorbing material (S40); drying the shock absorbing material (S50); and performing a surface sizing process on a surface of the dried shock absorbing material (S60).

Among the above-mentioned process steps, the method for manufacturing the shock absorbing material according to the present invention goes through the step (S30) of mixing the pulp suspension with cationic starch, and the step of vacuum-dehydrating the pulp cationic starch mixed with the pulp suspension to a dual direction using a vacuum former capable of dual vacuuming to manufacture a shock absorbing material (S40).

The conventional method of manufacturing a shock absorbing material using expanding and pressing the wastepaper fibers has a difficulty in maintaining a shock absorbing force of the shock absorbing materials unless the moisture contents of the shock absorbing material per se are maintained above a predetermined level due to the characteristics of the starch used as expanding supplementary agents. That is the reason why the present inventors have changed the method for manufacturing the shock absorbing material from an expanding and pressing method to a vacuum forming method.

Referring back to FIG. 4 for more detailed explanation, the method for manufacturing the wastepaper shock absorbing material using a vacuum forming principle according to the present invention goes through the step of disintegrating wastepaper selected from at least one or more of Korea Old Corrugated Containers (KOCC), Korea Old Newspaper (KONP) and milk cartons, using a blender (S10), where the corrugated paper and old newspaper are wastepaper from Korea Old Corrugated Containers (KOCC) and Korea Old Newspaper (KONP) respectively. Although the KOCC and KONP are preferred, it is apparent to those skilled in the art that the all the corrugated paper and old paper regardless of origin of countries can be used for the present invention. As a result, it should be understood and interpreted that the KOCC and KONP in the present invention include all the corrugated containers (OCC) and old newspaper known to those skilled in the art, including those from the domestic makers.

Figure 5:
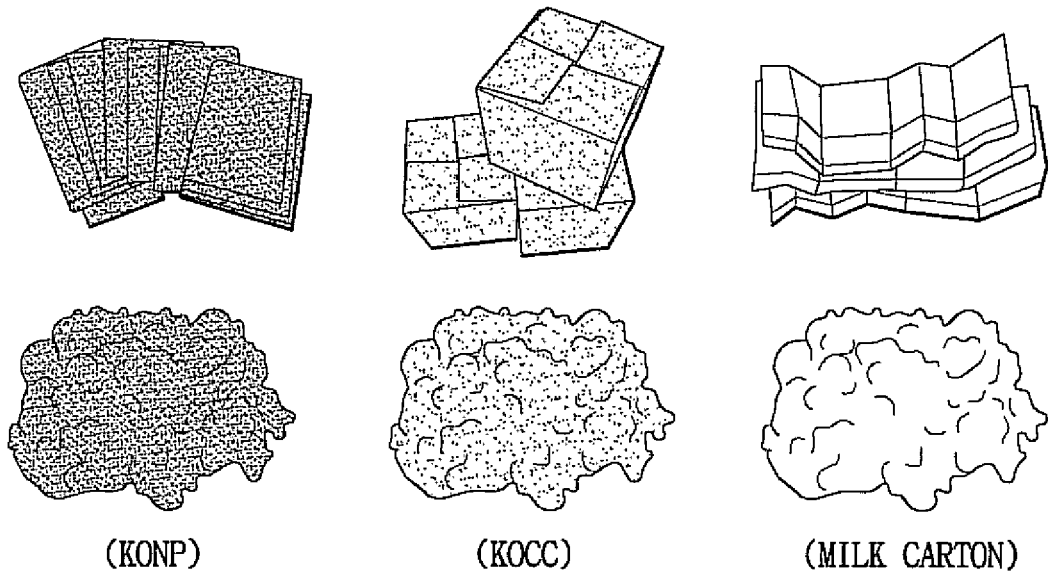
FIG. 5 is a mimetic diagram illustrating KOCC, KONP used as wastepaper and wastepaper fibers of milk carton, and dry-disintegrated states thereof.

The wastepaper used for the present invention may further include milk carton besides the aforementioned KOCC and the KONP. The milk carton may comprise the wastepaper along with the KOCC and the KONP according to the present invention, and the milk carton may be used for checking what influence will have on the properties of the shock absorbing material when KOCC and the KONP fibers are mixed with other different types of wastepaper. FIG. 5 is a photograph illustrating the KOCC, KONP used as wastepaper and wastepaper fibers of milk cartons, and disintegrated states thereof Furthermore, in order to find out what an influence an ink remaining in the wastepaper has on the properties of the shock absorbing materials, an ink attached to the wastepaper was removed from experimental floatation cells and bleached for manufacture of shock absorbing materials. De-inking and bleaching conditions of the wastepaper are given in the following Table 1.

TABLE 1

DE-INKING & BLEACHING CONDITIONS OF WASTEPAPER

| | Chemicals | Typical addition levels (%)* | Addition point |
|---|---|---|---|
| Deinking & Bleaching | NaOH | 102 | Pulper (pH 7.5) |
| | $H_2O_2$ | 0.8 | Pulper |
| | Sodium silicate | 1.5 | Pulper |
| | Soap(GOD-1012) | 1.0 | Pulper/flotation cells |
| Processing condition | Pulper condition: 50□, 30 min, 4% consistency | | |
| | Flotation condition: 40□, 20 min, 1% consistency, airflow rate 4 L/min | | |
| | Bleaching condition: 70□, 60 min, 1% consistency (pH 7.5) | | |

*Addition levels based on oven-dried pulp weight (g)

The first step for manufacturing a wastepaper shock absorbing material using a vacuum forming principle comprises: disintegrating wastepaper using a blender (S10) as noted above. The terms of disintegration implies a procedure of processing and boiling chemicals. In other words, the terms of disintegration means a procedure of making the KOCC, KONP and the wastepaper fibers of milk cartons into a disintegrated state as shown in the lower part of FIG. 5. This is a first procedure for recycling by breaking the wastepaper into pieces.

Following the disintegration of the wastepaper thus described, the method goes through the next step (S20) of diluting the disintegrated wastepaper to manufacture a pulp suspension. This procedure is a prerequisite for manufacturing the disintegrated wastepaper in a desired form according to the vacuum forming principle and by adding cationic starch. The concentration for diluting the disintegrated wastepaper is not specifically limited but it is preferred that the disintegrated wastepaper be diluted by 3% and be manufactured in a pulp suspension state.

Next, the method for manufacturing the wastepaper shock absorbing material using the vacuum forming principle includes the step (S30) of mixing the pulp suspension with cationic starch. The purpose of mixing the cationic starch is to reinforce the bonding of the disintegrated wastepaper, and it is preferred that cationic starch (Samyang Genex Co., Korea) having 0.06 DS (Degree of Substitution) be mixed by 0%, 1%, 2%, 3%, 4% and 5% against the total dry weight of the disintegrated fibers. Furthermore, the used cationic starch is preferably gelatinized at 80-85° C. before being put into the forming box (S21), and is diluted by 1% (S22).

Successively, the pulp cationic starch mixed with the pulp suspension is vacuum-dehydrated to a dual direction using a vacuum former capable of dual vacuuming to manufacture the shock absorbing material (S40).

The vacuum forming method in the present invention is employed by a shock absorbing material manufacturing principle in which the wastepaper suspension is formed in a predetermined shape and vacuumed for 5-10 seconds to remove an excessive amount of moisture contained in the fibrous suspension. Of course, although starch may be used as a forming supplementary agent just like the expanding shock absorbing material for enhancing the bond of the materials, the starch simply serves to act as a forming supplementary agent or a bonding enhancer, such that no excessive increase of compressive strength can be expected. The increase of compressive strength facilitates densification of the shock absorbing material to induce increases in compressive strength and elastic modulus, resulting in decrease in performance of the shock absorbing material.

Figure 6:
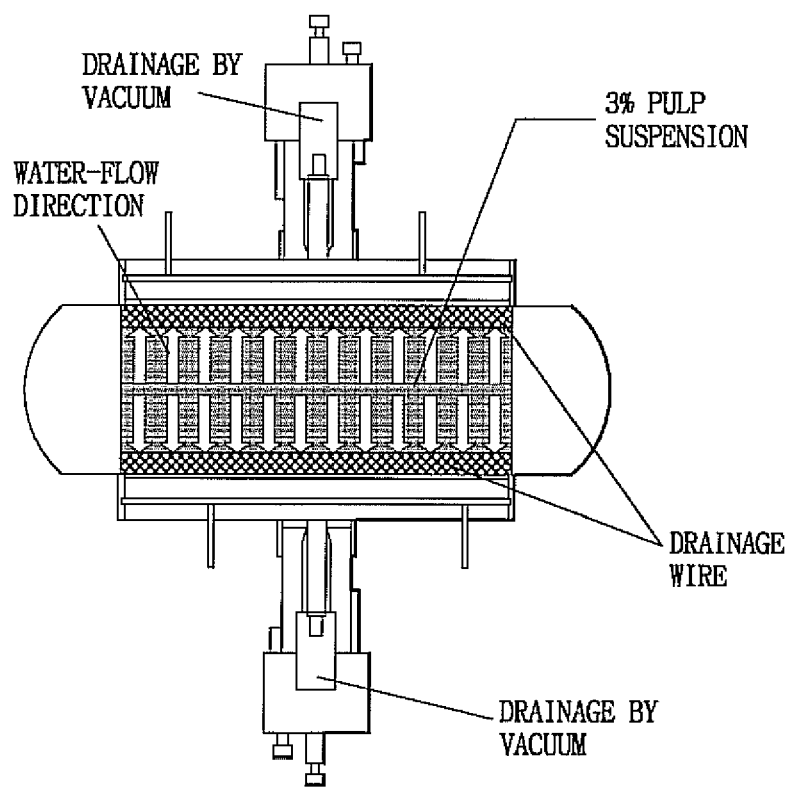
FIG. 6 is a cross-sectional view illustrating a vacuum former operated by a vacuum dehydrating principle to a dual direction according to the present invention.

The manufacturing principle of the shock absorbing material according to the present invention has no big difference from the conventional pulp mold manufacturing method in that the forming box is put with wastepaper stock suspension and there is no need of press process by a hot press plate. The present invention is a forming method as shown in FIG. 6 where the shock absorbing material is vacuum-dehydrated to a dual direction using a principle of a vacuum former, making the structure of the shock absorbing material having a large bulk state (a state of low density). FIG. 6 is a cross-sectional view illustrating the vacuum former operated by a principle of vacuum dehydrating the shock absorbing material to a dual direction according to the present invention. The detailed exemplary embodiment of the principle of vacuum former will be described later.

If moisture is removed from an internal structure of the shock absorbing material, interfiber bonds are restrained from occurring to a maximum to have an effect of making a large number of voids, unlike the pulp mold.

Figure 7:
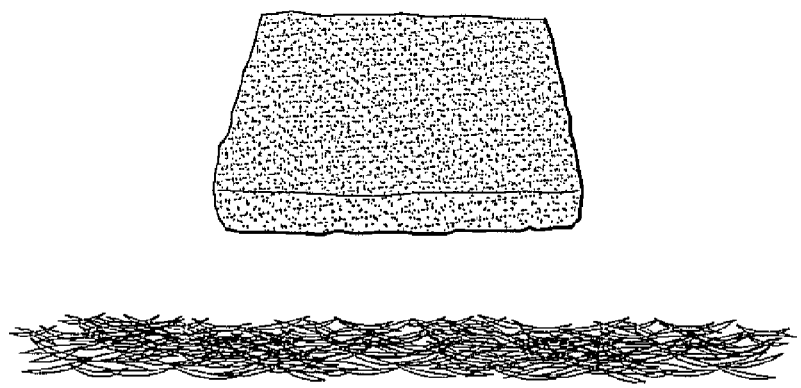
FIG. 7 shows a perspective view of wastepaper shock absorbing material and an inner structural view thereof according to the present invention.

Areas where the interfiber bonds are restrained form a loose fiber network as shown in FIG. 7, leaving a large number of small voids in the structure of the shock absorbing materials, which enables to obtain excellent property features including drying rate, brightness, apparent density, compressive strength, restoring ratio, elastic modulus and porosity. The property features thus described can effectively function to absorb the external shock, vibration or noise.

Figure 8:
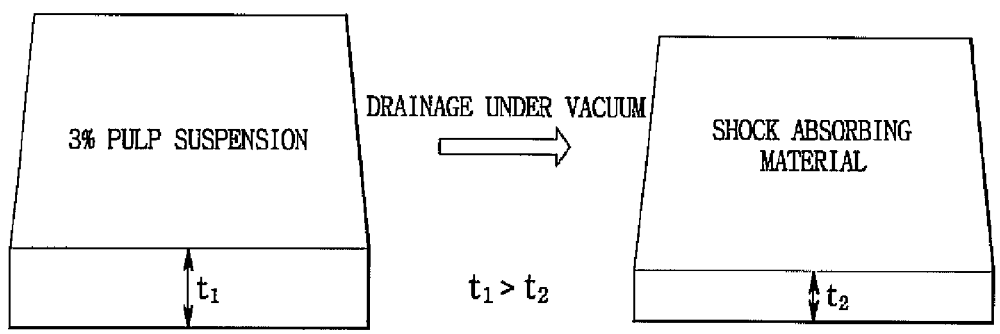
FIG. 8 is a mimetic diagram illustrating a cubic change between pulp suspension used for the present invention and a wastepaper shock absorbing material following the vacuum forming process according to the present invention.

FIG. 8 is a mimetic diagram illustrating a cubic change between pulp suspension used for the present invention and a wastepaper shock absorbing material following the vacuum forming process according to the present invention. FIG. 8 shows a rectangular shock absorbing material in which volume has decreased when a 3% wastepaper stock suspension is put into the forming box, vacuumed and dried. Although a whole size (length×width) has not decreased, a decrease in thickness has occurred across the board, and the volume has reduced. If an excessive vacuuming or a press process is applied as in the conventional method under this circumstance, a large densification occurs to close spaces (or separated voids) in the internal structure of the shock absorbing material, leading to disappearance of the shock absorbing ability.

Although it is unavoidable to experience a cubic change due decrease in thickness during drainage and drying processes, it is a core manufacturing technique to maintain the density to a minimum, i.e., to prevent the voids from disappearing from the internal structure of the shock absorbing material via an appropriate control of suction time. It is therefore preferable in the present invention to manufacture a thin shock absorbing material by reducing an input level of wastepaper suspension into the forming box.

Successively, the wastepaper shock absorbing material according to the present invention can be accomplished by the steps of drying the shock absorbing material thus manufactured (S50); and performing a surface sizing process on a surface of the dried shock absorbing material (S60). The drying of the shock absorbing materials is to remove excessive moisture remaining therein, and the surface sizing is to prevent fine fibers from falling from the surface of the shock absorbing material.

In light of the present invention thus described, the collected KOCC and KONP fibers have produced shock absorbing materials having poor properties if the KOCC and KONP fibers are disintegrated by the blender and immediately used for the manufacture of the shock absorbing materials. However, if the recycling of the wastepaper fibers is repeated, hornification progresses and flexibility of the fibers per se decreases to weaken the fiber bonds. If the wastepaper fibers are made into paper again, the hornification acts as a decisive factor to weaken the properties of the paper, but to greatly render services to enhance, if anything, the shock absorbing ability (shock absorbing performance) of the shock absorbing material if the wastepaper fibers are made into shock absorbing materials.

In other words, as the hornification is repeated, the fiber bonds weaken to decrease the consolidation and to increase the bulk of the shock absorbing material. As a result a large number of separated spaces or voids remain in the internal structure of the shock absorbing material, and if an external shock is applied, the spaces or the voids function to absorb or mitigate the shock. Consequently, as the hornification progresses further, the shock absorbing ability is improved, and it is expected that the shock absorbing material would act as one of the important means to maximize the recycling of the wastepaper fibers.

In order to maximize the shock absorbing performance of the shock absorbing material, it was effectively discriminated to repeat a cycle of wet disintegration-forming-drying-forming process, instead of disintegrating the wastepaper to manufacturing a shock absorbing material on the spot. Therefore, the present invention has discriminated that it is more advisable not to use the collected KOCC and KONP fibers on the spot for manufacture of the shock absorbing material but to repeat a cycle of wet disintegration and dry disintegration 2~3 times, as the physical properties of the shock absorbing material were expected to markedly improve with the recycling of the wastepaper fibers.

A detailed exemplary embodiment is illustrated hereunder for a vacuum former capable of performing a dual vacuuming for manufacturing shock absorbing materials by vacuuming dehydrating the pulp suspension mixed with cationic starch to a dual direction according to the present invention.

Figure 9:
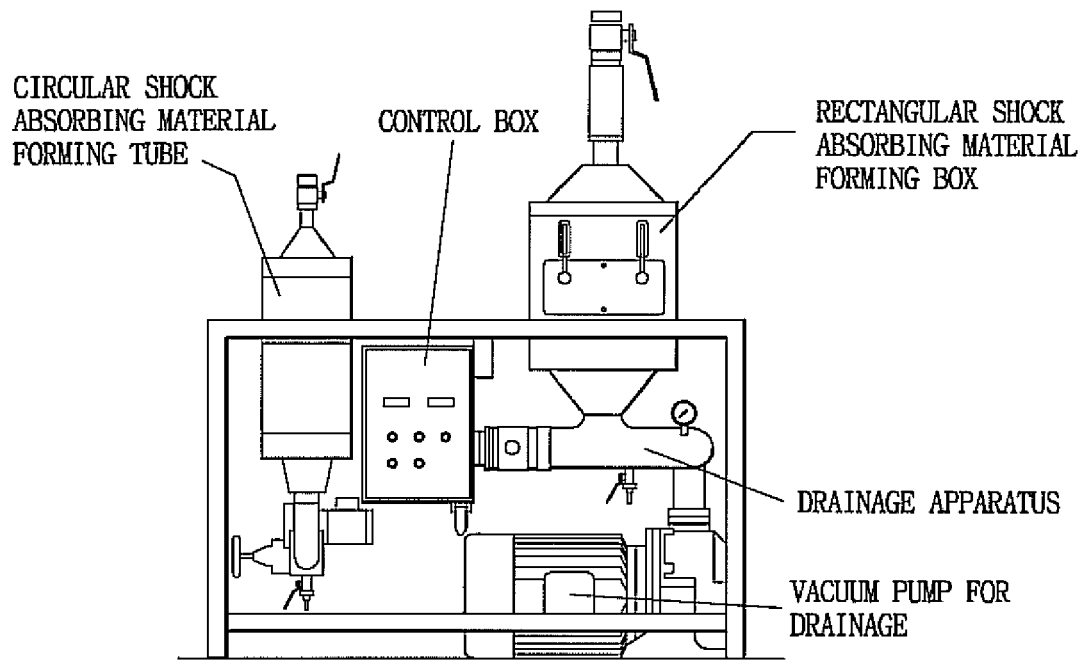
FIG. 9 is a front view of a vacuum former capable of dual vacuuming according to the embodiment of the present invention.
Figure 10:
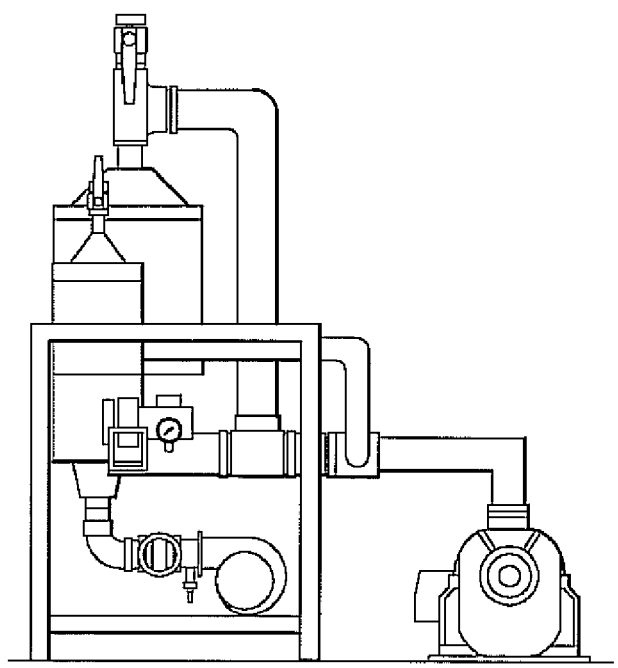
FIG. 10 shows lateral view of the vacuum former of FIG. 9.

FIG. 9 is a front view of a vacuum former capable of dual vacuuming according to the embodiment of the present invention, while FIG. 10 shows lateral view of the vacuum former of FIG. 9.

Referring to FIGS. 9 and 10, the vacuum former manufactured and used according to the present invention comprises: a rectangular shock absorbing material forming box, a circular shock absorbing material forming tube, a vacuum pump for drainage, a control box and a drainage apparatus.

Figure 11:
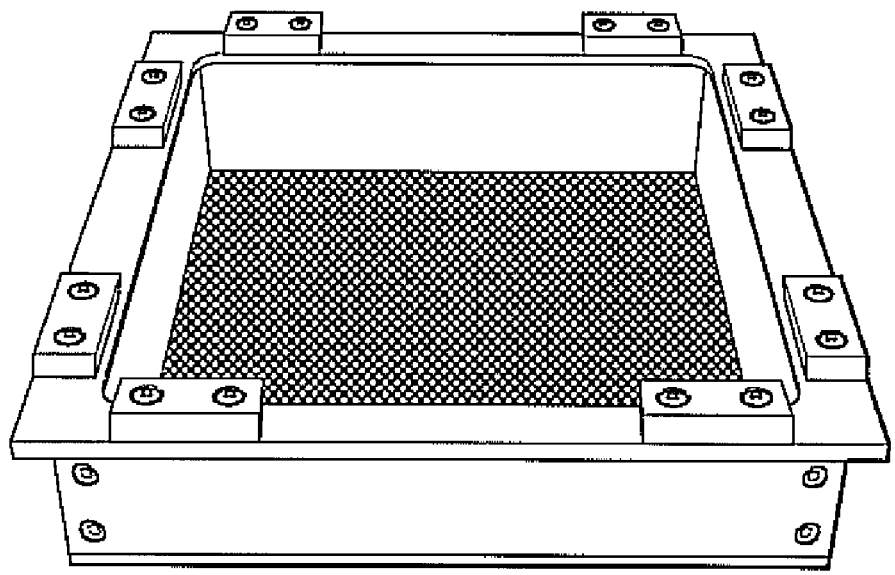
FIG. 11 is a perspective view illustrating a rectangular shock absorbing material forming box of a vacuum former and a circular forming tube of a circular former in FIG. 9.

The rectangular shock absorbing material forming box has a rectangular shape as shown in FIGS. 9 and 10, but may be formed of a circular shape, if necessary. As shown in FIG. 11, the rectangular forming box is arranged thereunder and thereon with a 40 mesh-sized dehydrating wire so as to facilitate a fast drainage when a suction is applied, and to allow air coming from a blower to easily pass for a quick evaporation of moisture. The shock absorbing material forming box is disposed thereunder with a hot wire for heating up to 300° C., and a blower for facilitating a fast evaporation of moisture toward the forming box by way of hot air heated by the hot wire. In other words, the evaporation of moisture is facilitated to reduce time for drying the shock absorbing materials by prompting the air heated by the hot wire to move toward the shock absorbing materials dehydrated and formed by the blower. This process facilitates reduction of time for drying the shock absorbing materials to thereby contribute to a reduced manufacturing cost of the shock absorbing materials.

The following Table 2 shows names, specifications and usages of each part of the vacuum former.

Pulp suspension stock mixed with 3% of cationic starch, a total dry weight of the stock being in 50-100 g with a volume of 1,700 mL to 3,400 mL, was put into a vacuum former capable of dual vacuuming for manufacturing of a rectangular shock absorbing material. Preferably, the pulp suspension stock mixed with 3% cationic starch having a volume of 100-130 mL (a total dry weight 3-4 g) is infused into a circular forming box for manufacture of a circular shock absorbing material. In the present invention, the suction time was changed from 10 to 60 seconds (10-second interval) to manufacture the shock absorbing material in order to check the physical properties thereof in response to the suction time.

In order to remove excessive moisture remaining in the formed shock absorbing materials, air heated to a temperature of approximately 150° C. was forcibly blown toward the formed shock absorbing material by a blower. The formed shock absorbing material was again dried in a drying oven up to moisture contents (5-8%) of the atmospheric state.

The surface of the dried shock absorbing materials comprises fine fibers coupled by interfiber bonds to therefore be vulnerable to easy chipping in the course of contact or abrasion in use. In order to complement the drawback, the surface of the shock absorbing material is treated with a surface sizing process using 1% gelatinized starch solution.

TABLE 2

CONFIGURATIONS AND DETAILED SPECIFICATIONS FOR EACH PART OF VACUUM FORMER

| names | specification | usage |
|---|---|---|
| Circular forming tube | □26 mm, Hole diameter □1 mm | Manufacture of circular shock absorbing materials |
| Rectangular forming box | 20 × 20 × 5 cm. 40 mesh | Manufacture of rectangular shock absorbing materials |
| Control box | Heater: 0-300□ Electric voltage: 220/380 V | Vacuum former power source (ON/OFF) Temperature control of rectangular forming box Temperature control of circular forming tube Blower power source (ON/OFF) |
| Vacuum pump for drainage | Pump: 0-760 mmHg RPM: 1730 rpm Frequency: 60 Hz Flow rate: 3 m³/min | Suction for removal of excessive moistures from stock suspension of the forming box |
| drainage pipe | □49.9 mm | Moving passage of water drained from the forming box |
| Ventilating fan | Electric voltage: 200 V Airflow rate: 4.3, 9.0 cm³/min | Moisture removal of drained shock absorbing materials |

First Embodiment

Manufacture of Wastepaper Shock Absorbing Materials Using Vacuum Forming Principle First of all, the domestically collected KOCC, KONP and milk cartons were disintegrated using a blender and diluted to a 3% concentration. Cationic starch (Samyang Zenex Co., Korea) having 0.06 DS (Degree of Substitution) was mixed by 0%, 1%, 2%, 3%, 4% and 5% against the total dry weight of the disintegrated fibers in order to reinforce the bonding force of the disintegrated fibers. The cationic starch was gelatinized at 80-85° C. before being put into the forming box, and is diluted by 1%.

Second Embodiment

Condition of Vacuum Former for Manufacture of Shock Absorbing Materials

The following Table 3 defines manufacturing conditions for each type of wastepaper used for manufacture of rectangular shock absorbing materials according to the present invention.

In order to check changes of physical properties in a shock absorbing material in response to suction time, the shock absorbing material was manufactured using 3% pulp suspension comprising 100% of KOCC and KONP in varying suction times from 10 to 60 seconds (10-second interval).

Changes of physical in the shock absorbing materials were also checked when woodfree wastepaper was added respectively to the KOCC and KONP. Disintegrated woodfree wastepaper was mixed with the KOCC and KONP fibers each at a predetermined ratio to check the changes of the physical properties of the shock absorbing material. Suction time was fixed at 10 seconds when the woodfree wastepaper was mixed. Changes of physical properties for the shock absorbing materials were also checked when KOCC and KONP suspension were added by cationic starch of varying addition levels. Suction time was fixed at 10 seconds when the cationic starch was mixed.

Furthermore, KOCC and KONP were respectively recycled and compared once, twice and thrice to see how physical properties of the shock absorbing material change in manufacturing the respective shock absorbing materials.

TABLE 3

MANUFACTURING CONDITIONS FOR EACH TYPE OF WASTEPAPER USED FOR MANUFACTURE OF SHOCK ABSORBING MATERIALS

| | Vacuuming time (sec)[2] | Cationic starch (%)[3] | Recycling No.[4] | Woodfree wastepaper (%)[5] |
|---|---|---|---|---|
| Wastepaper[1] | 10, 20, 30, 40, 50, 60 | 0, 1, 2, 3, 4, 5 | 0, 1, 2, 3 | 0, 30, 50, 70, 100 |

☐ All addition levels were based on oven-dried fiber weight(g).
[1] Wastepaper means KOCC and KONP respectively.
[2] When mixed with woodfree wastepaper without cationic starch, vacuuming time was fixed as 10 seconds.
[3] When mixed with woodfree wastepaper, the addition levels were adjusted to 0, 1, 3, and 5% based on oven-dried fiber weight.
[4] Recycling number was applied only without addition of woodfree wastepaper.
[5] When woodfree wastepaper without KOCC and KONP was used to make shock-absorbing materials, vacuuming time was adjusted to 10-60 seconds.

Third Embodiment

Measurement of Physical Properties for Vacuum-Formed Shock Absorbing Materials

Physical properties including drying rate, brightness, apparent density, compressive strength, restoring ratio, elastic modulus and porosity were measured to check the physical properties of shock absorbing materials manufactured with wastepaper fibers according to the present invention.

The moisture evaporation rate was measured in such a manner that an automatic moisture contents measuring instrument (Swiss Ohaus made. MB45) was connected to a terminal of a Personal Computer via a cable (RS232) to measure a moisture removal speed of shock absorbing materials manufactured by the vacuum former. The brightness of the shock absorbing materials was measured using a Brighterimeter Micro S-5/BOC of USA Technidyne. A Vernier caliper was used to measure the thickness of the shock absorbing materials for calculating the apparent density and an average value of upper and bottom side areas. The following equation (5-1) was used to calculate the apparent density of shock absorbing materials.

$$\text{Apparent Density } (g/m^3) = \frac{W}{T \times \frac{(A_t + A_b)}{2}} \quad (5-1)$$

where, W=Weight (g) of a shock-absorbing material,
T=Thickness(m) of a shock-absorbing material,
$A_t$=Area(m$^2$) of a top side of a shock-absorbing material, and
$A_b$=Area(m$^2$) of a bottom side of a shock-absorbing material.

A physical property analyzer (TA-XT2i, Stable Micro Systems Ltd.) was used to measure the physical properties of extrusions after the wastepaper was vacuum formed. The shock absorbing materials should have very low compressive strength and very excellent shock absorbing ability for absorbing external shocks and for protecting packed goods. Furthermore, it seems that the shock absorbing materials should also have elastic modulus of an appropriate level and restoring ratio for maintaining a shock absorbing efficiency following absorption of shock. Therefore, restoring ratio, compressive strength (kgf) and elastic modulus (kPa) were the data used for analysis of physical properties of expanding materials. The compressive strength was measured by plate compression experiments, and loading speed was defined as 30 mm/min which is within a range of 2,530 mm/min stipulated by ASAES368.3. The following equation (5-2) was used for calculating the elastic modulus.

$$\text{Elastic Modulus } (kPa) = \frac{\frac{P}{A}}{\frac{\Delta l}{l}} \quad (5-2)$$

where, P=compressive strength, A=area (m$^2$), $\Delta l$=displacement (m), l=diameter(m).

The restoring ratio of the shock absorbing material was calculated by the following equation (5-3)

$$\text{Restoring ratio } (\%) = \frac{\Delta l_1 - \Delta l_2}{\Delta l_1} \times 100 \quad (5-3)$$

where, $\Delta l_1$=Distance of a load cell applied (=5 mm), and $\Delta l_2$=Distance when compressive strength is zero.)

Fourth Embodiment

Calculation of Porosity of Shock Absorbing Materials

First of all, the shock absorbing materials were embedded by the following method in order to calculate porosity thereof according to the present invention. DDSA Dodecenyl Succinic Anhydride, Polysciences, Inc.) and MNA (Methyl Nadic Anhydride, Polyscience, Inc.) were used as hardener for Epon 812 (Polysciences, Inc.), a kind of epoxy, and DMP-30 (bis-Dimethylaminomethyl phenol, Polysciences, Inc.) was used as hardening surfactant.

A solution (100 g of epon 812 mixed by 112 g of dodecenyl succinic anhydride) and B solution (100 g of epon 812 mixed by 75 g of methyl nadic anhydride) are mixed for the experiment. If the A solution is infused more, the hardening epoxy is softened, and if the B solution is put more, epoxy is hardened. The two solutions are adjusted per mixing ratio, and surfactant DMP-30 corresponding to 1.5-2% of the two mixed solution was added for uniform mixture The solution mixture was left alone for polymerization for 12 hours at 35° C., for 12 hours at 45° C. and 48 hours at 60° C. following addition of surfactant and using a vacuum oven (The polymerization may be performed by using UV light.)

Figure 12A:
FIGS. 12a and 12b are photographs illustrating a dyed thin specimen of a shock absorbing material and a thin specimen binary-processed according to the present invention.
Figure 12B:
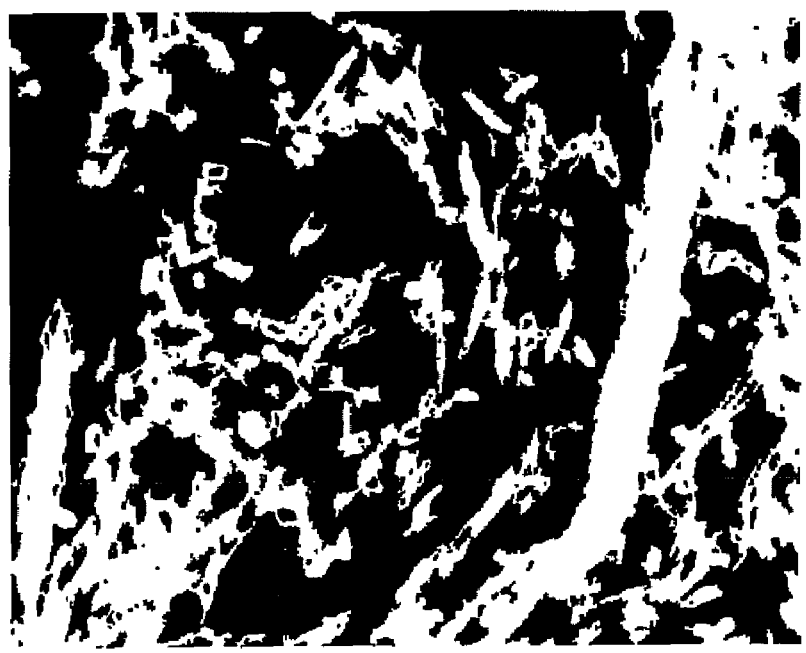

The embedded shock absorbing material were made into a thin film having a thickness of approximately 20 μm using a rotary HistoSTAT-820 (Manufactured by Reichert) and dyed in 1% of Toludine Blue solution. A cross-sectional view of the dyed thin film was photographed using an Olympus optical microscope (FIG. 12). The image of cross-sectional photograph of the shock absorbing material was transformed into a binary image (FIG. 12b) by Axiovision 4.4 image analyzing program of Carl Zeiss (Germany), and regions shown in black corresponding to voids were obtained by image analyzing program to calculate porosity of the shock absorbing material. When voids except for fibers (white areas) are considered as voids not filled by fibers, as shown in FIG. 12b, the porosity of the shock absorbing material can be obtained by dividing an entire region by spaces (voids) not filled by fibers, which can be calculated by the following equation (5-4)

$$\text{Porosity (\%)} = \frac{V_t - V_s}{V_t} \times 100 \quad (5\text{-}4)$$

where, $V_t$-$V_s$=Volume of voids, and $V_t$=Total volume,

The actual porosity is a cubic conception, but we tried to anticipate the number of voids possessed by the whole shock absorbing material based on a porosity having a cross-section of 20 μm.

Fifth Embodiment

Cross-Sectional Shape of Shock Absorbing Material

The shock absorbing materials are supposed to absorb external shocks so as not to give any damage to packed goods. In order to absorb the shock, the shock absorbing materials should have a porous inner structure. In other words, the shock absorbing materials should have a bulky structure of low density.

Figure 1:
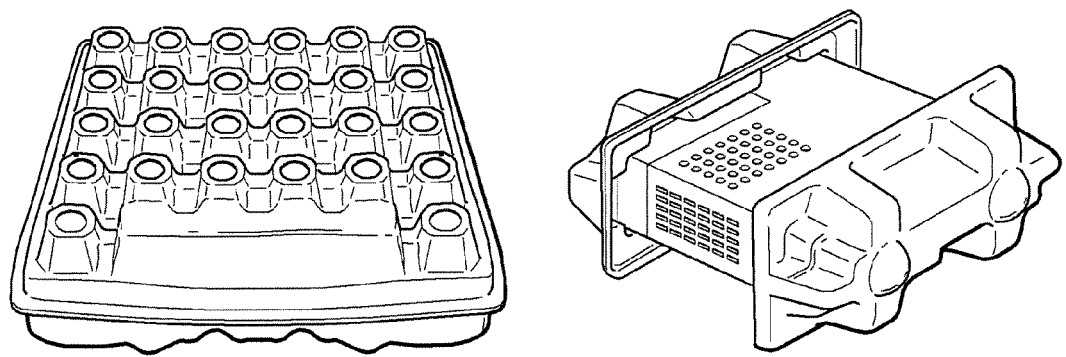
FIG. 1 is a photograph illustrating an egg case made by a pulp mold according to prior art.
Figure 2:
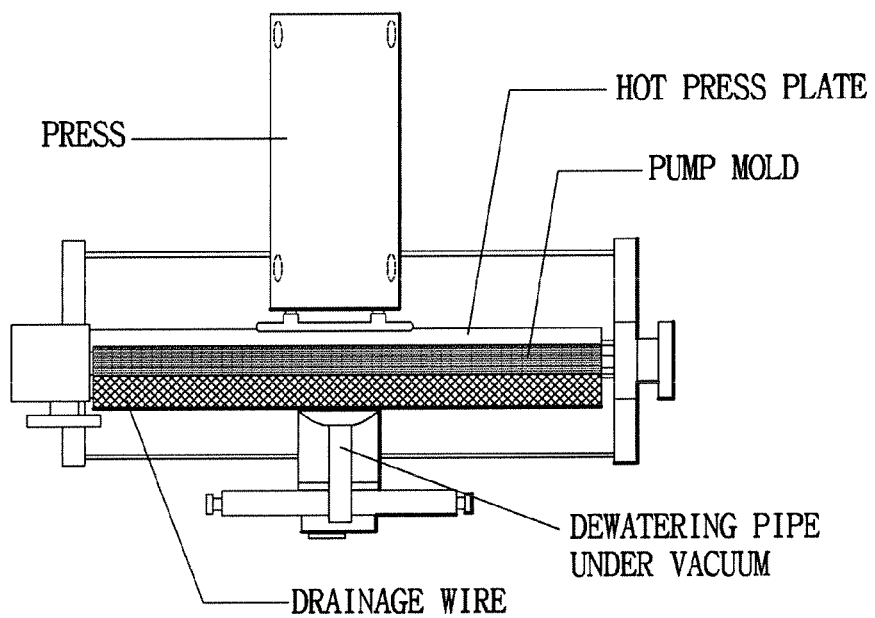
FIG. 2 is a cross-sectional view illustrating a pulp mold manufacturing apparatus according to the prior art.
Figure 3:
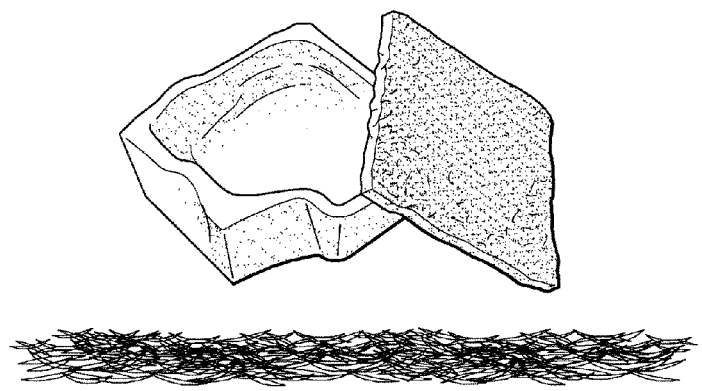
FIG. 3 shows a perspective view and an inner structural view of a pulp mold according to the prior art.

It is very difficult for molded shock absorbing materials such as egg cases to absorb external shocks because the materials per se are densely and uniformly structured therein (FIG. 13a). In other words, as depicted in FIG. 14, pulp mold serves as a medium to which the external shocks are directly transferred in the packed goods. The pulp mold shock absorbing materials should be given prominences and depressions to follow the contour of the packed goods as shown in FIG. 1, and form a space between the pulp mold and the packed goods to enable to absorb the external shocks.

Meanwhile, the shock absorbing material manufactured with wastepaper according to the present invention is disposed at an inner structure thereof with irregular and loose formation giving rise to creation of many voids therein, unlike the cross-sectional structure of the pulp mold. The vacuum-formed shock absorbing material is formed therein with sufficient spaces for absorbing the external shocks even if the shocks are applied, such that most of the shocks are removed inside the shock absorbing material as illustrated in FIG. 14b. As a result, the shock absorbing material acts to protect the packed goods from the external shocks.

Figure 13:
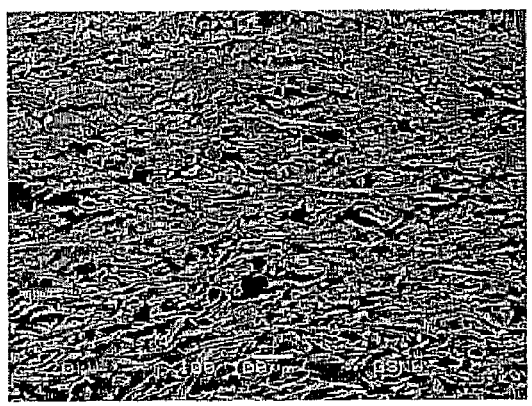
FIG. 13 is a cross-sectional photograph of a pulp mold according to the prior art and a shock absorbing material according to the present invention.
Figure 13:
Figure 14:
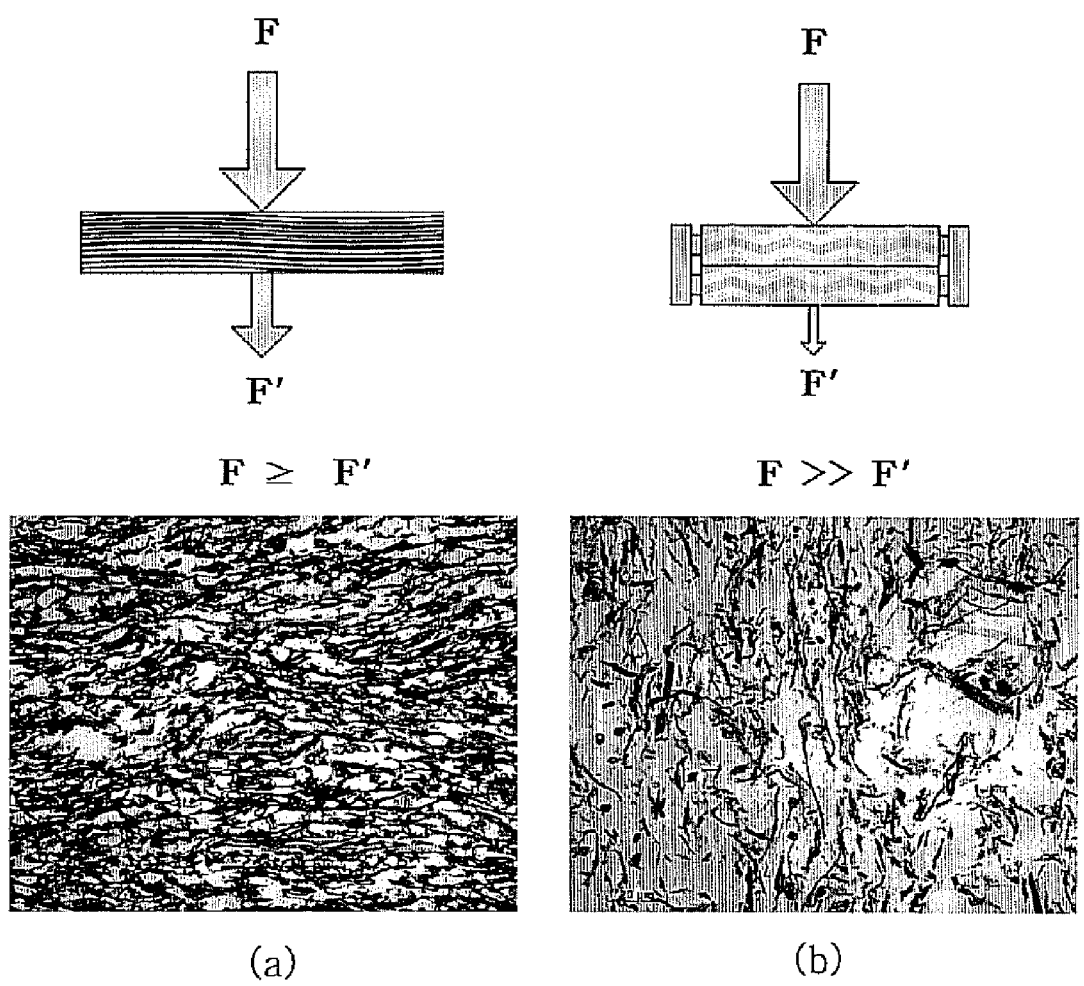
FIG. 14 is a mimetic diagram and photograph illustrating a pulp mold according to the prior art and a state of a shock absorbing material applied with an external force, the force being absorbed and removed according to the present invention.

FIG. 13 is a cross-sectional photograph of a pulp mold according to the prior art and a shock absorbing material according to the present invention, and FIG. 14 is a mimetic diagram and photograph illustrating a pulp mold according to the prior art and states of shock absorbing material applied with an external force, the force being absorbed and removed according to the present invention.

FIG. 14a shows that an external force (F) passes the densely formed pulp mold only to be a little bit let up after the pass. However, FIG. 14b shows that the external force (F) penetrates a very loosely formed shock absorbing material only to be absorbed therein in most of its force (F), and only a small portion (F') of the force (F) passes the shock absorbing material to thereby enable to protect the packed goods.

Sixth Embodiment

Changes of Physical Property of Shock Absorbing Materials in Response to Suction Time If pulp suspension of 3% concentration is put into a forming box and vacuumed during manufacture of a rectangular shock absorbing material, drainage is performed thereon.

The drying time can be reduced after forming as much moisture contained in the pulp suspension is removed through the vacuuming process, which in turn contributes to the reduction of manufacturing cost of the shock absorbing materials. However, there is a drawback of markedly reducing the shock absorbing performance if excessive suction is performed to density the surface of the shock absorbing material. Therefore, it is important to decrease the drying load by adjusting the suction time adequately. Because the suction time and the manufacturing cost are very important processes, each being closely related, to which a careful attention should be paid. Furthermore, amount of wastepaper comprising the shock absorbing materials of a predetermined volume should be reduced as much as possible. In other words, the amount of wastepaper fiber comprising the structure of the shock absorbing material may be reduced if only density thereof is lowered, contributing to decrease in the manufacturing cost. Therefore, the drying time and the density of shock absorbing material are essential elements for evaluating the economy of shock absorbing material.

In evaluating functions of the shock absorbing material in terms of physical aspect thereof, the elastic modulus (kPa) and density ($g/m^3$) are the most important elements. The following Table 4 shows a comparative result of values of styrofoam and pulp mold against elastic modulus and apparent density possessed by each shock absorbing material when KOCC and KONP fibers are once-recycled for manufacture of the shock absorbing materials with varying suction times.

TABLE 4

CHANGES OF PHYSICAL PROPERTY OF SHOCK ABSORBING MATERIALS IN RESPONSE TO SUCTION TIMES

| Wastepaper[1] | | Suction time (sec.) | | | | | | |
|---|---|---|---|---|---|---|---|---|
| | | 0 | 10 | 20 | 30 | 40 | 50 | 60 |
| Once-recycled KOCC | Elastic modulus (kPa) | | 169.66 | 473.07 | 661.04 | 594.75 | 675.01 | 713.79 |
| | S.D.[2] | | 31.12 | 46.23 | 35.89 | 5.62 | 16.56 | 15.63 |
| | Apparent density (g/cm$^3$) | | 0.115 | 0.132 | 0.137 | 0.148 | 0.153 | 0.148 |
| | S.D. | | 0.005 | 0.006 | 0.006 | 0.007 | 0.007 | 0.007 |
| Once-recycled KONP | Elastic modulus (kPa) | | 553.63 | 561.00 | 584.62 | 582.82 | 617.93 | 667.04 |
| | S.D. | | 34.13 | 17.57 | 39.65 | 54.13 | 14.84 | 22.31 |
| | Apparent density (g/cm$^3$) | | 0.153 | 0.155 | 0.158 | 0.158 | 0.163 | 0.169 |
| | S.D. | | 0.007 | 0.007 | 0.007 | 0.007 | 0.008 | 0.008 |
| Styrofoam | Elastic modulus (kPa) | 941.28 | | | N/A | | | |
| | S.D. | 26.90 | | | | | | |
| | Apparent density (g/cm$^3$) | 0.028 | | | | | | |
| | S.D. | 0.001 | | | | | | |
| Mold | Elastic modulus (kPa) | 1767.79 | | | N/A | | | |
| | S.D. | 40.40 | | | | | | |
| | Apparent density (g/cm$^3$) | 0.292 | | | | | | |
| | S.D. | 0.012 | | | | | | |

[1]Wastepaper means KOCC and KONP respectively.
[2]S.D. means standard deviation.

Figure 15:
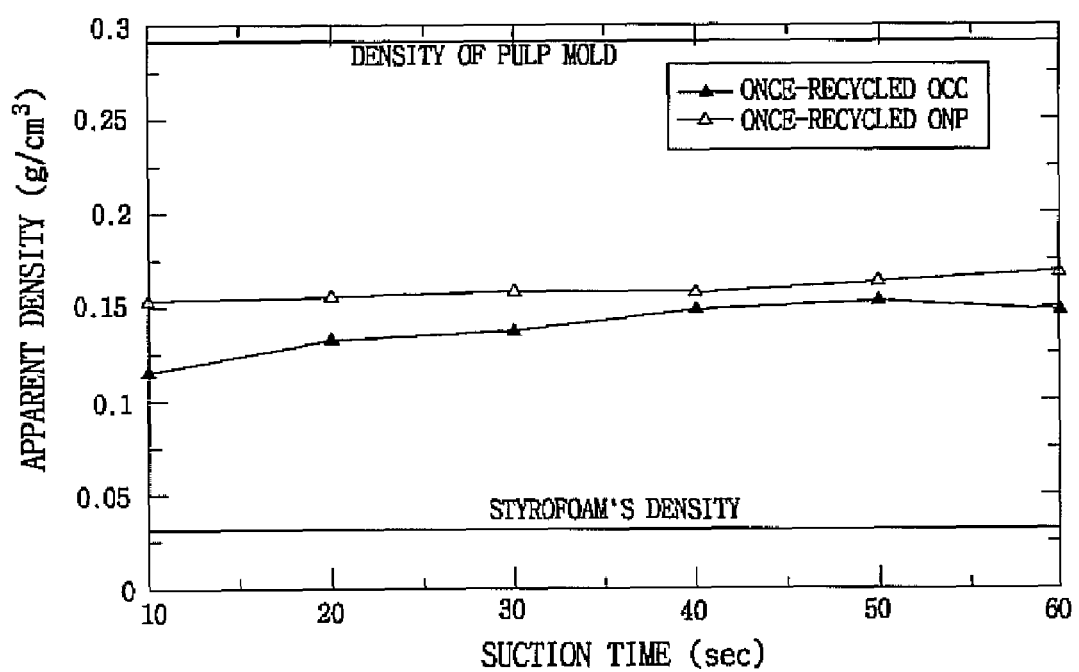
FIG. 15 is a graph illustrating changes in density in relation to suction time of shock absorbing materials according to the present invention.

FIG. 15 is a graph illustrating changes of apparent density of shock absorbing material according to changes of suction time of the vacuum former in comparison with values of pulp mold and Styrofoam based on the result of FIG. 4.

Referring to FIG. 15, as the suction time is lengthened, the apparent density of shock absorbing materials made of KOCC and KONP is easily noticed to gradually increase. The meaning of the density being increased defines that structure of the shock absorbing material is further densified such that the shock absorbing performance is caused to decrease. The decrease of shock absorbing performance further implies that the manufacturing cost increases because much more quantity of wastepaper fibers is needed for manufacturing shock absorbing material having a predetermined thickness. It is therefore more than essential to maintain a large bulky state of shock absorbing material under a short suction time using a small quantity of wastepaper when the shock absorbing material is to be manufactured.

Referring back to FIG. 15, it can be noticed that density of Styrofoam is approximately 0.03 g/cm$^3$, 10 times less than the pulp mold having a density of 0.3 g/cm$^3$. Meanwhile, shock absorbing materials made of KONP and KOCC have a density of 0.12-0.17 g/cm$^3$ in response to suction time, such that the shock absorbing materials made of KONP and KOCC are manufactured with much less density than that of pulp mold, although 3-5 times more density than that of the Styrofoam.

It should be noted that there is a density difference between shock absorbing materials made of KOCC and those made of KONP. The shock absorbing material made of KONP showed much higher apparent density than that of those made of KOCC regardless of suction time. This result seems to come from a fact that paper grade of wastepaper comprising the KONP is different from that of wastepaper made of KOCC. The domestic newspaper uses almost 100% of old magazine paper (OMP) and old newspaper (ONP), as against the European or USA newspaper using thermomechanical pulp (TMP). If paper is made of only with newspaper wastepaper, density increases due to increased short length fiber and fine fiber content to make the density very high, such that paper having a low friction factor can be manufactured, compared with thin paper made of virgin pulp.

Meanwhile, corrugated cardboard consists of liner and corrugated medium, where the liner is manufactured with unbleached kraft pulp (kraft liner), or with 100% of OCC (test liner), whereas the corrugated medium is made of 100% of corrugated medium. Although liner of most of the corrugated cardboard circulated in the Korean domestic market is made of American Old Corrugated Containers (AOCC), the liner is also manufactured with mixture of unbleached kraft pulp. As a result, there exists a considerably large amount of lignin in the corrugated cardboard, compared with that of the newspaper, such that the corrugated cardboard is composed of much more rigid fibers compared with fibers removed of lignin.

As is illustrated in FIG. 15, the reason the shock absorbing material made of ONP has a higher density than those made of OCC (Old Corrugated Containers) is that the shock absorbing material of ONP is composed of much lignin-removed fibers. This finding implies that the shock absorbing material made of OCC has more pores capable of absorbing the externals shocks.

Figure 16:
FIG. 16 is a photograph (×1000) of an electron microscope illustrating interfiber bonds by microfibrils comprising a shock absorbing material according to the present invention.

Analytically, the tracheid consists of a primary wall, a secondary wall with S1, S2 and S3 layers and fibrous lumen. The primary wall and the S1 layer of the secondary wall are removed by mechanical shocks and friction during stock constituting or refining process to generate internal fibrillation and external fibrillation phenomena at the S layer of the secondary wall. The microfibrils composed of cellulose chains play a very important role in bonding with neighboring fibers and are known to function as primary bonding media which are very important roles in improving the bulky state of the shock absorbing material (see FIG. 16). The bonding power necessary for forming a large spaces inside the shock absorbing material and concurrently maintaining a shape of the shock absorbing material seemingly result from a bond between neighboring fibers and a bond between the microfibrils existing therebetween.

Figure 17:
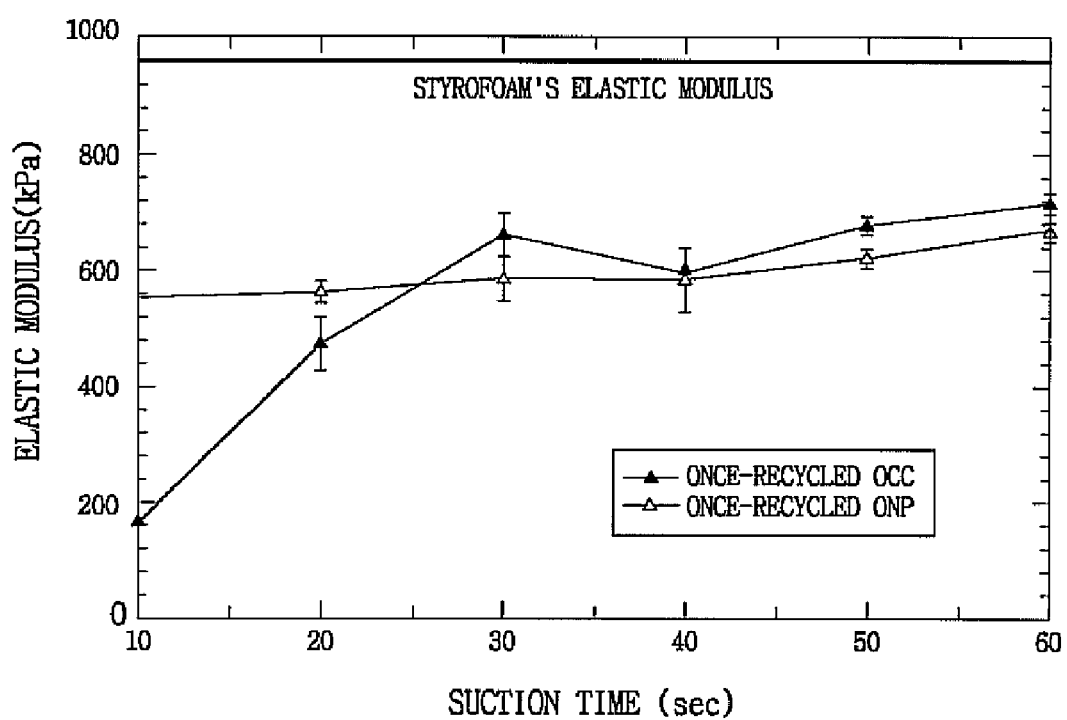
FIG. 17 is a graph illustrating changes in elastic modulus in shock absorbing materials in relation to suction time of a vacuum former according to the present invention.

FIG. 17 is a graph illustrating a comparison between elastic moduli of shock absorbing materials made of KOCC and KONP with that of Styrofoam. In evaluating the shock absorbing performance, a too-high-elastic modulus defines that force of moving external shocks toward packed goods increases, resulting in possible breakage of the packed goods. Therefore, it is better to have an elastic modulus as low as possible for use in shock absorbing materials. The Styrofoam having an elastic modulus of approximately 941 kPa showed a little higher elastic modulus than that of shock absorbing materials made of KOCC and KONP. This means that shock absorbing materials made of two kinds of wastepaper have more excellent shock absorbing performance than that of the Styrofoam. However, if the elastic modulus of shock absorbing material is too low, there is a possibility of generating a structure-destroying phenomenon by external shocks to thereby cause damage to packed goods. Consequently, forming should be so performed as to have an inner structure capable of maintaining a minimum elastic modulus.

Now, with reference to changes of the elastic modulus of the shock absorbing materials, the shock absorbing material made of KOCC showed an elastic modulus a little higher than that made of KONP except for suction time of 10-20 seconds. However, considering that a difference between the two shock absorbing materials is not that big, and the economic suction time is less than 20 seconds, the suction time exceeding 20 seconds only serves to densify the structure (texture) of the shock absorbing material. Therefore, judging from the fact that shock absorbing material made of KOCC showed a much lower elastic modulus, when compared with those made of KONP, under the suction time of less than 20 seconds, it may be said that KOCC fibers are better raw materials than KONP in making shock absorbing materials. As shown from the result of the apparent density in FIG. 15, the fact that density of the shock absorbing material made of KOCC is lower than that of KONP can easily anticipate that elastic modulus of the shock absorbing material made of KOCC is lower than that of KONP. Now that it is known that the raw material comprising KOCC is the rigid unbleached kraft pulp containing lots of lignin, it can be discriminated that Campbell force necessary for interfiber bonds was not strongly acted during a very short period of suction time. Therefore, it seems that shock absorbing materials having a loose bonding structure were made to result in manufacturing shock absorbing materials of lower elastic modulus than that of KONP.

Seventh Embodiment

Changes of Physical Property of Shock Absorbing Materials in Response to Mixed Ratio of Milk Carton and Vacuum-Dehydration Time The following Table 5 shows a result of how apparent density and elastic modulus of the shock absorbing materials have changed when milk carton or cartonboard was mixed at a predetermined ratio during manufacturing of shock absorbing materials using KOCC and KONP. The milk carton is a high quality bleached kraft pulp, and is collected with its inner surface coated with polyethylene on which food or milk is contained when it is manufactured for use as a milk pack.

TABLE 5

CHANGES OF PHYSICAL PROPERTY OF SHOCK ABSORBING MATERIALS IN RESPONSE TO MIXED RATIO OF MILK CARTON AND SUCTION TIME

| Wastepaper[1] + Milk carton | | Suction time (sec.) | | | | | |
|---|---|---|---|---|---|---|---|
| | | 10 | 20 | 30 | 40 | 50 | 60 |
| KOCC 100% | Elastic modulus (kPa) | 169.66 | 473.07 | 661.04 | 594.75 | 675.01 | 713.79 |
| | S.D.[2] | 31.12 | 46.23 | 35.89 | 5.62 | 16.56 | 15.63 |
| | Apparent density (g/cm$^3$) | 0.115 | 0.132 | 0.137 | 0.148 | 0.153 | 0.148 |
| | S.D. | 0.005 | 0.006 | 0.006 | 0.007 | 0.007 | 0.007 |
| KOCC 70% + Milk carton 30% | Elastic modulus (kPa) | 527.24 | 546.49 | 577.48 | 621.15 | 685.37 | 723.98 |
| | S.D.[2] | 23.85 | 7.36 | 11.95 | 14.35 | 12.87 | 14.81 |
| | Apparent density (g/cm$^3$) | 0.159 | 0.162 | 0.164 | 0.166 | 0.168 | 0.171 |
| | S.D. | 0.007 | 0.008 | 0.008 | 0.008 | 0.008 | 0.008 |
| KOCC 50% + Milk carton 50% | Elastic modulus (kPa) | 457.82 | 542.43 | 546.31 | 633.66 | 632.31 | 664.41 |
| | S.D. | 23.68 | 19.83 | 21.79 | 21.88 | 38.34 | 25.10 |
| | Apparent density (g/cm$^3$) | 0.152 | 0.156 | 0.153 | 0.167 | 0.170 | 0.171 |
| | S.D. | 0.007 | 0.007 | 0.007 | 0.008 | 0.008 | 0.008 |
| KOCC 30% + Milk carton 70% | Elastic modulus (kPa) | 239.87 | 316.79 | 322.16 | 445.70 | 554.90 | 593.91 |
| | S.D. | 6.70 | 14.29 | 5.42 | 22.57 | 43.85 | 32.15 |
| | Apparent density (g/cm$^3$) | 0.133 | 0.146 | 0.146 | 0.160 | 0.162 | 0.166 |
| | S.D. | 0.006 | 0.006 | 0.006 | 0.008 | 0.008 | 0.008 |
| KONP 100% | Elastic modulus (kPa) | 553.63 | 561.00 | 584.62 | 582.82 | 617.93 | 667.04 |
| | S.D. | 34.13 | 17.57 | 39.65 | 54.13 | 14.84 | 22.31 |
| | Apparent density | 0.153 | 0.155 | 0.158 | 0.158 | 0.163 | 0.169 |

TABLE 5-continued

CHANGES OF PHYSICAL PROPERTY OF SHOCK ABSORBING MATERIALS IN RESPONSE TO MIXED RATIO OF MILK CARTON AND SUCTION TIME

| Wastepaper[1] + Milk carton | | Suction time (sec.) | | | | | |
|---|---|---|---|---|---|---|---|
| | | 10 | 20 | 30 | 40 | 50 | 60 |
| | (g/cm³) S.D. | 0.007 | 0.007 | 0.007 | 0.007 | 0.008 | 0.008 |
| KONP 70% + Milk carton 30% | Elastic modulus (kPa) | 541.49 | 555.11 | 636.56 | 1047.79 | 1204.60 | 1216.75 |
| | S.D. | 3.96 | 9.75 | 25.79 | 30.16 | 86.66 | 90.47 |
| | Apparent density (g/cm³) | 0.155 | 0.169 | 0.164 | 0.197 | 0.209 | 0.209 |
| | S.D. | 0.007 | 0.008 | 0.008 | 0.011 | 0.012 | 0.012 |
| KONP 50% + Milk carton 50% | Elastic modulus (kPa) | 510.26 | 564.54 | 544.06 | 577.84 | 589.89 | 664.78 |
| | S.D. | 10.83 | 33.02 | 9.96 | 20.38 | 33.58 | 50.01 |
| | Apparent density (g/cm³) | 0.148 | 0.165 | 0.168 | 0.161 | 0.173 | 0.176 |
| | S.D. | 0.006 | 0.008 | 0.008 | 0.008 | 0.008 | 0.009 |
| KONP 30% + Milk carton 70% | Elastic modulus (kPa) | 243.17 | 323.73 | 422.87 | 470.54 | 560.70 | 631.23 |
| | S.D. | 22.25 | 23.12 | 31.70 | 12.20 | 28.11 | 50.87 |
| | Apparent density (g/cm³) | 0.143 | 0.149 | 0.162 | 0.161 | 0.168 | 0.174 |
| | S.D. | 0.006 | 0.006 | 0.008 | 0.008 | 0.008 | 0.008 |

[1] Wastepaper means KOCC and KONP respectively.
[2] S.D. means standard deviation.

Figure 18A:
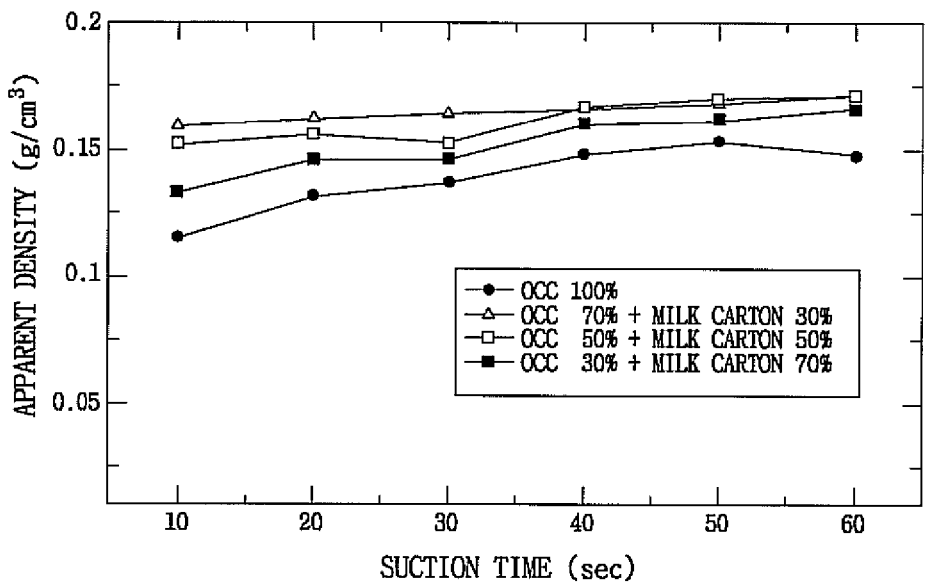
FIGS. 18a and 18b are graphs illustrating changes of apparent density in shock absorbing materials in relation to mixed rates of milk cartons and suction time according to the present invention.
Figure 18B:
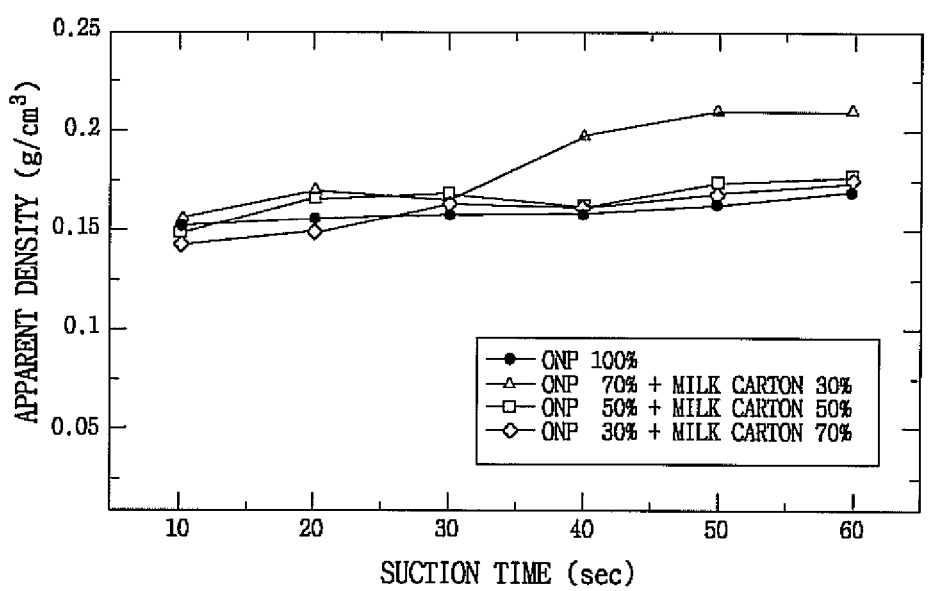

FIGS. 18a and 18b are graphs illustrating changes of apparent density in shock absorbing materials in relation to changes of mixed rate of a milk carton and suction time during vacuum forming based on the result of the apparent density given in FIG. 5, where it was noticed that the apparent densities of shock absorbing materials showed respectively different values if the milk carton is mixed with KOCC and KONP. Particularly, if the milk carton is mixed with KOCC fibers, a high quality of bleached kraft pulp having an excellent flexibility was made, such that if the KOCC fibers (length-weighted average fiber length 1.86 mm) are added by milk carton fibers, the density of the structure increases due to increased interfiber bonds compared with shock absorbing material made of only KOCC (length-weighted average fiber length 1.28 mm), as shown in FIG. 18a. However, if the quantity of the milk carton is less added than that of KOCC fibers, the density of structure in the shock absorbing material increases more due to short-length fibers contained in KOCC fibers. In a nutshell, densification of structure is further promoted as the milk carton is more added except for the shock absorbing material made of only 100% KOCC, thereby affecting the increase in the apparent density.

Meanwhile, density of the KONP fibers showed no big difference from that of shock absorbing material made of only KONP fibers (length-weighted average fiber length 1.01 mm) except for addition of 30% of milk carton fibers. This is because the KONP fibers employ repeatedly-used wastepaper to allow short-length fibers and fine fibers to be repeatedly made and to prompt the short-length fibers and fine fibers to fill vacant spaces between fibers during manufacturing of shock absorbing materials, becoming less vulnerable to addition of milk carton fibers. On the contrary, if KONP comprising very fine fibers is added by a small quantity (30%) of milk carton fibers comprising long length fibers, there showed no big difference of apparent density in response to addition of milk carton fibers unless the suction time exceeds 30 seconds. If the suction time lasts more than 30 seconds, there may be generated a tight contact between the milk carton fibers composed of long length fibers and the KONP fibers to further improve the interfiber bonds.

Conclusively, a markedly improved result was not able to be obtained, compared with shock absorbing material made of 100% of KOCC or KONP although some improvement was made on the bulk state of the shock absorbing materials made of KOCC and KONP by addition of milk carton fibers composed of long length fibers. It could be confirmed that it is more profitable to manufacture shock absorbing materials of good bulky state, i.e., of low density, only with low-priced KOCC or KONP fibers.

Figure 19A:
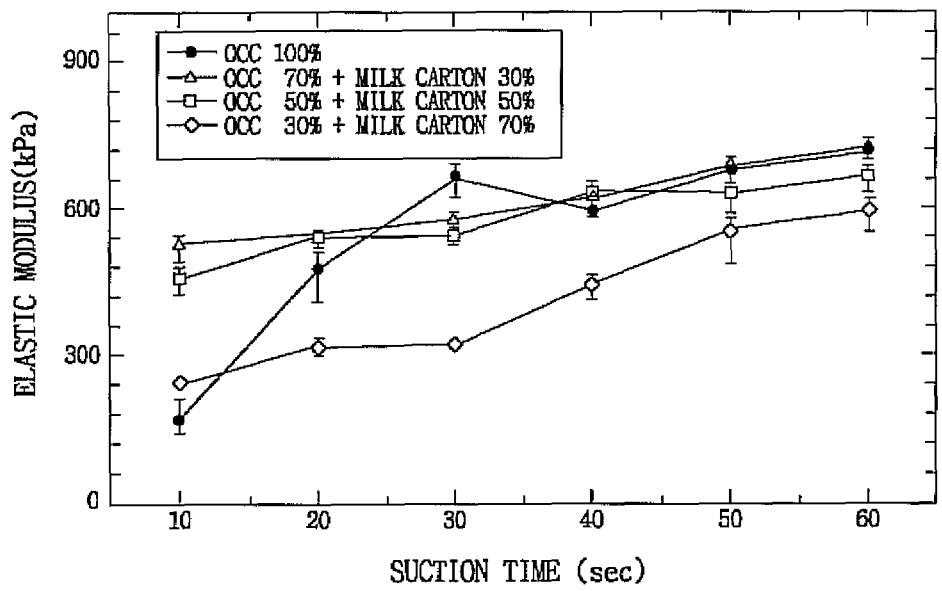
FIGS. 19a and 19b are graphs illustrating changes of elastic modulus in shock absorbing materials in relation to mixed rates of milk cartons and suction time of a vacuum former according to the present invention.
Figure 19B:
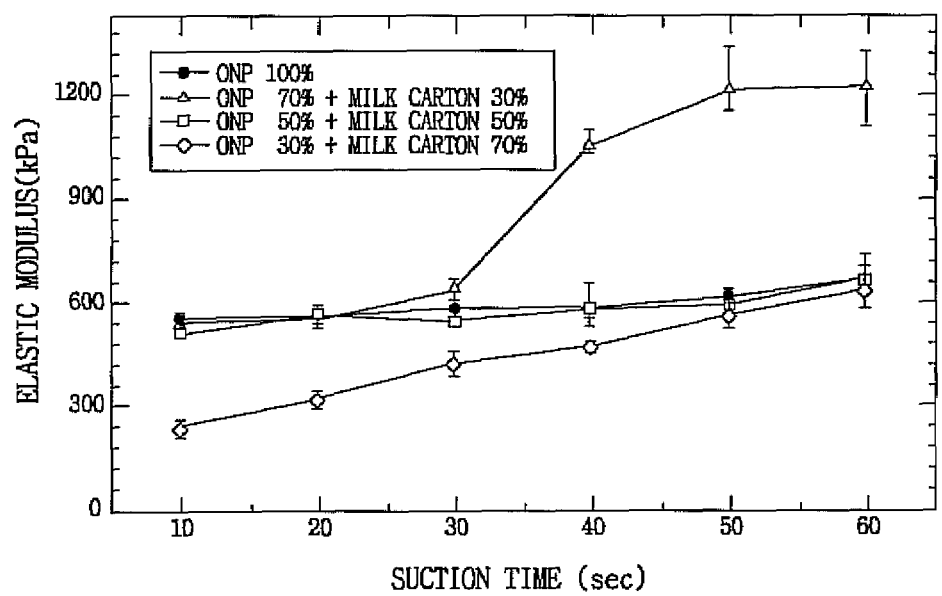

FIGS. 19a and 19b are graphs illustrating changes of elastic modulus in shock absorbing materials when milk carton fibers are respectively mixed with KOCC and KONP fibers and suction times were given differently.

As depicted in FIG. 19a, if KOCC fibers are mixed with milk carton fibers, there is a good chance of the lengthy milk carton fibers bonding with KOCC fibers to improve an elastic modulus of shock absorbing materials. If the suction time is prolonged, the KOCC containing a relatively large quantity of short-length fibers is densely bonded with the inner structure of the shock absorbing material to facilitate a sharp increase in the elastic modulus. However, the elastic modulus of shock absorbing material made of only KOCC showed a less value than that of shock absorbing material that includes more than a predetermined ratio of milk carton fibers, when given a suction time of approximately 10 seconds. It seems that the KOCC fibers made of unbleached kraft pulp containing a considerable quantity of lignin showed a significantly less bonding force than that of milk carton fibers to come up with a shock absorbing material having a low density and a low elastic modulus. In a nutshell, presuming that an ideal shock absorbing material is manufactured with a shorter suction time, it is preferably determined that a shock absorbing material be manufactured only with KOCC.

Referring to FIG. 19b, a lower elastic modulus was registered from a shock absorbing material made of KONP as milk carton stocks composed of long length fibers are much added, which is a different value from that of KOCC. As noticed from the apparent density in FIG. 18b, a lowest elastic modulus was shown when 70% of milk cartons are added. Unlike the KOCC, it seems that, because the KONP has lots of short length fibers and fine fibers therein, KONP fibers fill the voids of fiber network comprising long length fibers to result in increase in the density and the elastic modulus. Consequently, shock absorbing materials containing less KONP fibers have shown the lowest elastic moduli, such that, in using newspaper waste, it seemed advantageous to add fibers having long length fibers. In conclusion, it seemed to be ideal to use KOCC fibers only in manufacturing shock absorbing materials of KOCC, while a shock absorbing material of KONP must be mixed with a large quantity of wastepaper stocks of long length fibers.

Eighth Embodiment

Changes of Physical Property of Shock Absorbing Materials in Response to Quantity of Mixed Starch and Recycling Frequency of Wastepaper Starch has long been used in paper manufacturing industries, such that the starch is one of the most widely used dry-strength additives. Natural starch has a negative ion just like fibers to bring forth a rapid decrease of usage due to its very low retention efficiency. As a result, a necessity for introducing a new starch having a positive ion has strongly surfaced, and as an alternative thereto, cationic starch has been developed. The cationic starch is manufactured by generating an etherifying reaction while pH and temperatures are increased using epoxy chemicals having a quaternary ammonium group. If the cationic starch thus described is put into fiber suspension, molecules of cationic starch are attached to fibers to promote interfiber bonds and to improve paper strength.

The shock absorbing materials are manufactured with a large bulky state unlike that of the general paper, such that interfiber bonds are very weak. Although the shock absorbing performance may be expected to improve to a large extent if shock absorbing materials are manufactured in the given condition, there is a high probability that shape of the shock absorbing material can be easily destroyed. Accordingly, there is a necessity to add dry-strength additives in order to improve the interfiber bonds. However, an excessive use of the dry-strength additives exceeding a predetermined adequate quantity would promote an excessive consolidation of inner structure of the shock absorbing materials to result in the damage to the shock absorbing performance. Therefore, studies for determining quantity of additives at an adequate level have been necessitated, leading to finding out changes of physical properties in response to added quantity of cationic starch.

Furthermore, on condition that a shock absorbing material made of wastepaper must have an environment-friendly aspect of unlimited recycling merit unlike the Styrofoam, changes of physical property in the shock absorbing materials were studied here when shock absorbing materials are newly made using recycled shock absorbing materials.

The following Table 6 shows apparent densites and elastic moduli of shock absorbing materials manufactured of KOCC and KONP fibers in using cationic starch as dry-strength additives. The Table 6 also shows changes of apparent density and elastic modulus in response to recycling of shock absorbing materials made of KONP and KOCC.

TABLE 6

CHANGES OF PHYSICAL PROPERTY OF SHOCK ABSORBING MATERIALS IN RESPONSE TO QUANTITY OF MIXED STARCH AND RECYCLING FREQUENCY OF WASTEPAPER

| | Wastepaper[1] | | Cationic starch (%)* | | | | |
|---|---|---|---|---|---|---|---|
| | | | 1 | 2 | 3 | 4 | 5 |
| KOCC | 1[2] | Elastic modulus (kPa) | 532.09 | 401.24 | 440.47 | 754.34 | 574.75 |
| | | S.D.[3] | 29.54 | 26.28 | 60.50 | 52.80 | 54.27 |
| | | Apparent density (g/cm$^3$) | 0.154 | 0.143 | 0.150 | 0.156 | 0.152 |
| | | S.D. | 0.007 | 0.006 | 0.006 | 0.007 | 0.007 |
| | 2 | Elastic modulus (kPa) | 553.43 | 405.94 | 389.81 | 499.88 | 691.77 |
| | | S.D. | 7.75 | 2.54 | 27.29 | 24.27 | 30.12 |
| | | Apparent density (g/cm$^3$) | 0.153 | 0.148 | 0.149 | 0.161 | 0.165 |
| | | S.D. | 0.007 | 0.006 | 0.006 | 0.008 | 0.008 |
| | 3 | Elastic modulus (kPa) | 261.13 | 210.77 | 253.33 | 302.02 | 392.72 |
| | | S.D. | 0.82 | 23.43 | 33.95 | 9.96 | 18.33 |
| | | Apparent density (g/cm$^3$) | 0.159 | 0.137 | 0.152 | 0.164 | 0.168 |
| | | S.D. | 0.007 | 0.005 | 0.007 | 0.008 | 0.008 |
| KONP | 1 | Elastic modulus (kPa) | 655.41 | 477.47 | 528.74 | 962.11 | 939.53 |
| | | S.D. | 16.22 | 39.99 | 19.82 | 27.18 | 47.29 |
| | | Apparent density (g/cm$^3$) | 0.156 | 0.145 | 0.153 | 0.158 | 0.178 |
| | | S.D. | 0.006 | 0.006 | 0.007 | 0.007 | 0.009 |
| | 2 | Elastic modulus (kPa) | 571.58 | 307.73 | 533.98 | 591.51 | 685.03 |
| | | S.D. | 16.79 | 17.90 | 10.37 | 29.43 | 19.56 |
| | | Apparent density (g/cm$^3$) | 0.148 | 0.148 | 0.154 | 0.175 | 0.168 |
| | | S.D. | 0.006 | 0.006 | 0.007 | 0.008 | 0.008 |

TABLE 6-continued

CHANGES OF PHYSICAL PROPERTY OF SHOCK ABSORBING
MATERIALS IN RESPONSE TO QUANTITY OF MIXED STARCH
AND RECYCLING FREQUENCY OF WASTEPAPER

| Wastepaper[1] | | Cationic starch (%)* | | | | |
| --- | --- | --- | --- | --- | --- | --- |
| | | 1 | 2 | 3 | 4 | 5 |
| 3 | Elastic modulus (kPa) | 548.96 | 366.54 | 460.57 | 542.98 | 587.82 |
| | S.D. | 18.46 | 36.91 | 11.47 | 8.03 | 5.58 |
| | Apparent density (g/cm$^3$) | 0.157 | 0.155 | 0.164 | 0.170 | 0.168 |
| | S.D. | 0.007 | 0.007 | 0.008 | 0.008 | 0.008 |

Figure 20A:
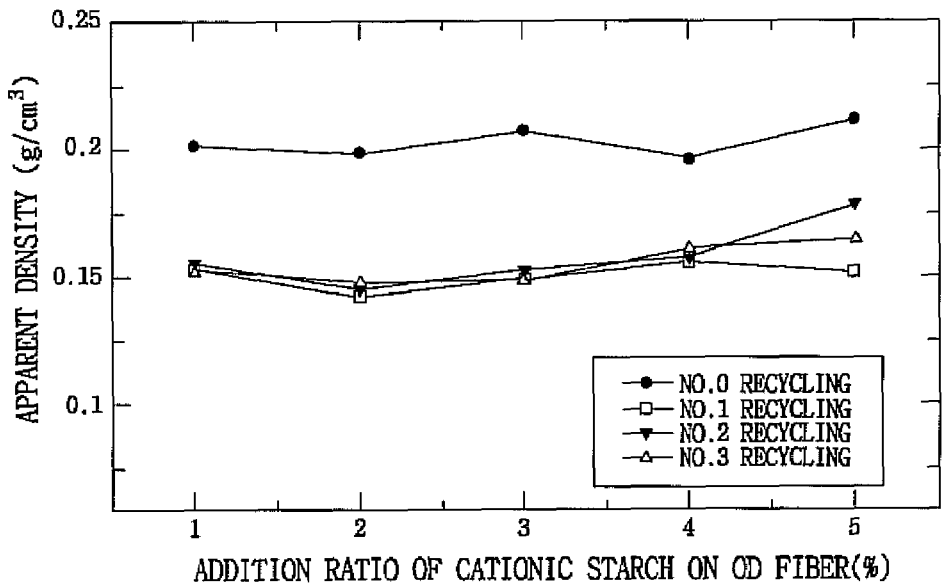
FIGS. 20a and 20b are graphs illustrating changes of apparent density in shock absorbing materials in response to addition ratio of cationic starch and recycling of the shock absorbing materials according to the present invention.
Figure 20B:
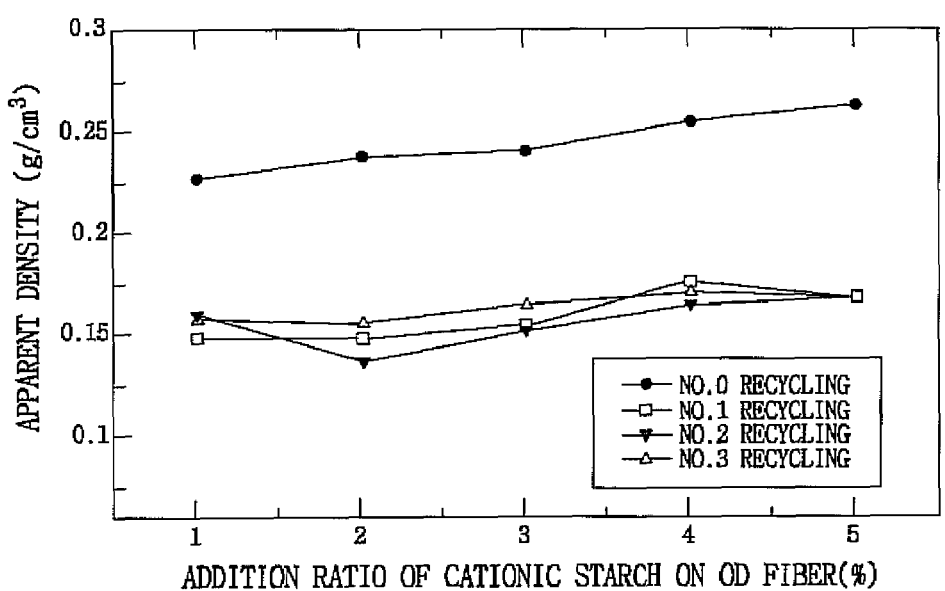

[1]Wastepaper means KOCC and KONP respectively.
[2]Recycling frequency was applied only without addition of woodfree wastepaper. 1: Once recycled, 2: Recycled twice, 3: Recycled three times
[3]S.D. means standard deviation.
*Based on OD pulp weight FIGS. 20a and 20b are graphs illustrating changes of apparent density of shock absorbing materials made of KOCC and KONP based on values shown in Table 6.

There were no big changes in the apparent density of the shock absorbing materials when less than 4% of cationic starch was added to a total dry weight of wastepaper fibers regardless of recycling frequency (number), and the apparent density increased only when more than 4% of cationic starch was added. However, the incremental width was nominal, such that it was discriminated that addition of 4-5% level of cationic starch would positively contribute to retaining the shape of the shock absorbing materials as bonding additives without having a great influence on densification of the inner structure of the shock absorbing materials. Particularly, it was discriminated that effect of addition ratio of starch could be slighted regardless of types of wastepaper such as KOCC or KONP in response to recycling frequency.

One important fact was found out in this experiment. When shock absorbing materials were made using once-recycled KOCC and KONP, the apparent density of the shock absorbing material showed a very high value of approximately 0.2 g/cm$^3$. The high level of apparent density is inadequate for use in shock absorbing materials such that a separate technical process thereto must be applied. Referring again to FIGS. 19a and 19b, it could be noted that an apparent density dropped to approximately 50-70% level of the initial apparent density when the above shock absorbing material was dry-defibrated, or recycled. There was no big difference between the initial recycling and the dry-defibrated, second and third recycling of the shock absorbing material. It is known that rigidity of fibers advances due to fiber hornification that occurs when paper made of chemical pulp is repeatedly used to continuously increase the short length fibers and fine fibers. The fiber hornification decreases the possibility of continuously using the re-cycled paper fibers to have an absolute influence on the decreased physical properties of the paper.

However, it was noted that the fiber hornification had positively influenced on the manufacturing the shock absorbing materials. As the recycling is repeated, the fiber hornification also repeatedly occurs to seriously degrade the interfiber bonding ability. Particularly, because the press process which is essential in paper manufacturing process is omitted in the course of manufacturing the shock absorbing materials and the drying process ensues right after the vacuuming, drying of the shock absorbing materials is performed in the bully state. It seems that a large bulky state of the shock absorbing materials, that is, a low density is being retained in a state where the fiber hornification resultant from repeated recycling advances to degrade the interfiber bonding ability of individual fibers. As noted above, a very large number of voids are formed within a same volume in response to lower density to thereby provide shock absorbing materials a much better advantageous foothold in performing the shock absorbing ability.

Although there is a considerable difficulty in continuously manufacturing paper of good physical properties with the use-repeated wastepaper according to the present invention, it was found that use of the recycling-repeated wastepaper had had a very positive influence on manufacturing the shock absorbing materials. The physical properties of wastepaper thus described are expected to desirably contribute to the economic recycling of wastepaper resources. Furthermore, the present invention has provided an occasion to unlimitedly use the wastepaper resources as environmentally-friendly alternative materials to Styrofoam.

In conclusion, in manufacturing shock absorbing materials using KOCC and KONP, if the amount of starch added to as a bonding supplementary agent is at 4-5% of a total dry weight of wastepaper fiber, densities of the shock absorbing materials are not greatly affected to expect an affirmative result in retaining the shapes of the shock absorbing materials. Furthermore, it can be noted that manufacturing of shock absorbing materials by dry disintegration through wet pulping and drying processes can produce a better result having a bulky state than that of manufacturing of the shock absorbing materials right after reclaiming of KOCC and KONP wastepaper fibers. Better still, it was noted that if the used shock absorbing materials were reclaimed to manufacture shock absorbing materials again, a positive result was shown in forming shock absorbing voids inside the shock absorbing materials.

Figure 21A:
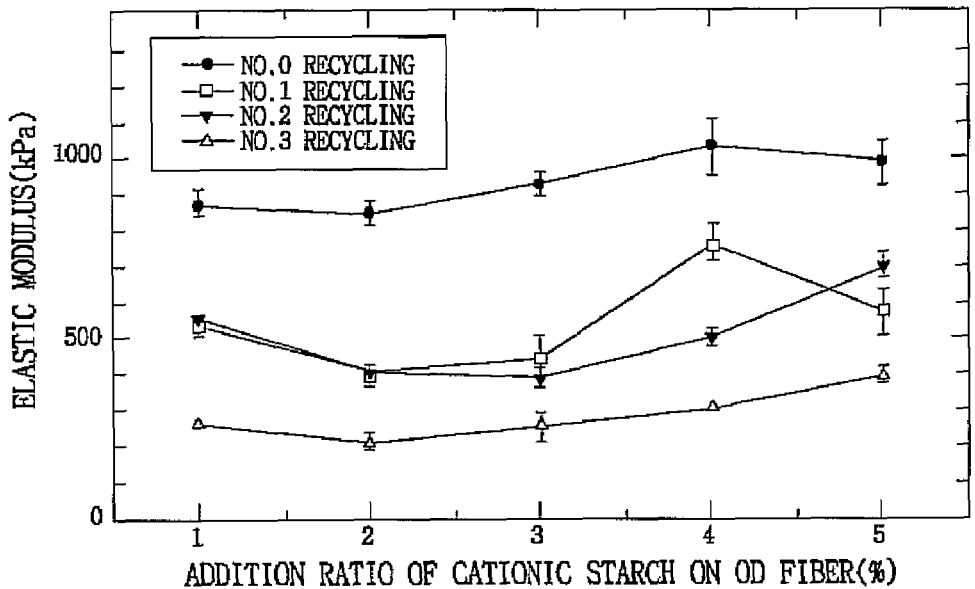
FIGS. 21a and 21b are graphs illustrating changes of elastic modulus in shock absorbing materials in response to addition ratio of cationic starch and recycling frequency of the shock absorbing materials in relation to KOCC and KONP.
Figure 21B:
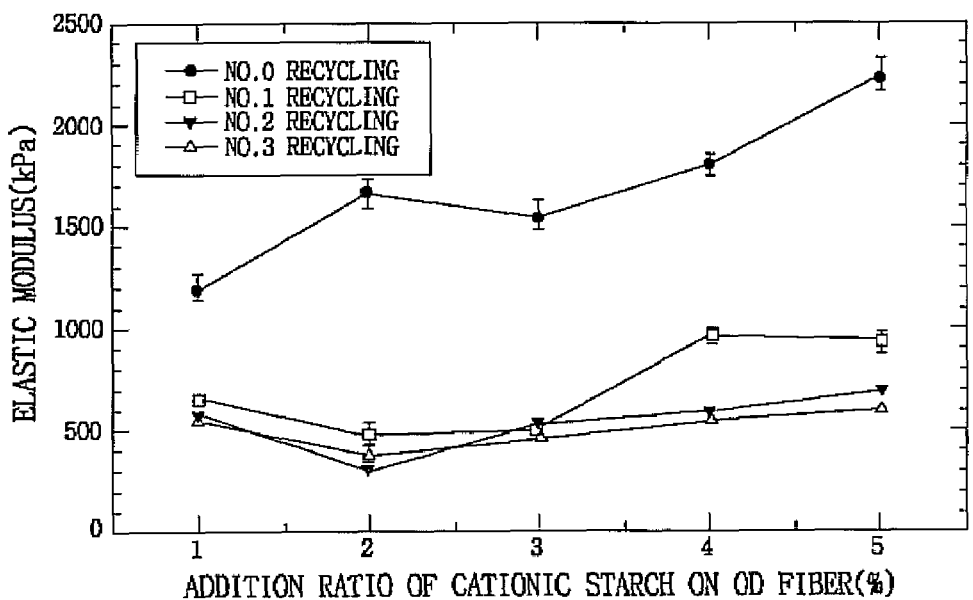

FIGS. 21a and 21b are graphs illustrating changes of elastic modulus in shock absorbing materials in response to addition ratio of cationic starch and recycling frequency (number) of the shock absorbing materials in relation to KOCC and KONP. Although it can be anticipated from the apparent densities in FIG. 20, addition of 4% or more starch against the total dry weight of the wastepaper fibers could only start making a slight difference in the elastic moduli of the shock absorbing materials. It was difficult to find a significant difference if less than 4% of starch is added regardless of recycling frequency. This means that addition of cationic starch can hardly have a great influence on the elastic moduli of the shock absorbing materials only to increase the inner bonding force and to have a positive effect on retainment of shapes of shock absorbing materials. Referring again to FIG. 21b, just like the changes of elastic moduli of shock absorbing materials made of never-recycled KONP, if a sharp increase in the elastic modulus is resulted from addition of cationic starch, densification of inner structure of the shock absorbing materials and shock absorbing performance abruptly decrease to show an inadequate physical properties for use in shock absorbing materials. Therefore, even if the cationic starch is added, a predetermined countermeasure should be taken to increase only the inner bonding force while the apparent densities and the elastic moduli are not sharply increased.

One noticeable and interesting result as in FIG. 21a was that the elastic moduli during three times of recycling of shock absorbing materials made of KOCC had decreased to a greater extent than that of less than twice-recycled. Typically, repetition of recycling generates a repeated hornification, leading to rigidity of fibers, and decreased bonding force of fibers. It is well known that repeated use of chemical pulp leads to deterioration of fiber quality including tensile strength, burst strength, light scattering coefficient and folding endurance of paper, due to hornification. It seems that, as recycling is repeated on KOCC principally composed of unbleached kraft pulp, the principle of the physical properties being decreased is rightfully applied. Because shock absorbing materials of lower elastic moduli can absorb external impacts and better protect the packed goods, it is a very interesting result to disclose a fact that recycling of shock absorbing materials does not degrade but improve the shock absorbing performances.

As depicted in FIG. 21b, the changes of elastic modulus in response to recycling frequency in KONP have shown a different tendency unlike that of KOCC. It showed that the elastic modulus of repeated recycling dropped to less than approximately 50% level compared with that of non-repeated recycling. This finding implicates that, as the repeated recycling advanced in KOCC, the hornification progressed to rigidify and stiffen the fibers. In other words, as drying and wetting are repeated, crystallized regions inside fibers increase to drop flexibility of the fibers. However, because KONP fibers are composed of magazine newspaper mixed with mechanical pulps and chemical pulps, and ONP fibers, the KONP fibers showed a tendency different from that of KOCC fibers as illustrated in FIG. 21b. Common mechanical pulp fibers contain lignin, such that there are voids capable of holding water even if the drying and wetting processes are repeated. The voids help promote the flexibility of fibers such that the hornification of the fibers is slowly advanced to increase the physical properties of the fibers, unlike those of the KOCC fibers.

Conclusively, it was noticed that elastic moduli of shock absorbing materials made of KOCC and KONP showed no great changes when cationic starch of less than 4% of the total dry weight of wastepaper was added only to increase the interfiber bonds of the shock absorbing materials. Furthermore, it was noted that the shock absorbing ability of the shock absorbing materials improved, if anything, as the recycling is repeated compared with those of the wastepaper fibers of no recycling, Ninth Embodiment Porosity of Shock Absorbing Materials Manufactured by Vacuum Forming Process Shock absorbing materials must have a porous inner structure formed by lots of voids. In order for shock absorbing materials made of wastepaper to have a difference from that of mold forming, a press process is omitted to advance to the drying process right after the vacuum forming process. The shock absorbing materials currently on the market made by the pulp mold process have a very dense structure due to compressive forming, making it difficult to have a porous structure and to absorb external shocks. However, shock absorbing materials respectively made of KOCC and KONP fibers and formed by vacuuming have loose bonds in between neighboring fibers and have an improved ability of absorbing the external shocks.

Porosity is one of many concepts explaining the physical properties of a substance, and a substance can have various physical and functional characteristics according to level of porosity. Variations affecting porosity of shock absorbing materials include suction times, wastepaper types, lengths of wastepaper fibers and arranged methods of fibers. It was discriminated however that the most important factor is the bonding type of fibers. This closely relates to suction time during the vacuum forming and addition ratio of cationic starch used as bonding additives of shock absorbing materials. The lengthy suction time helps consolidate fibers to a direction to which vacuuming is applied to thereby strengthen bonds in between the fibers. Furthermore, an excessive use of cationic starch as dry-strength additives before the vacuum forming enhances the bonding ability between the fibers to densify the inner structure of the shock absorbing materials. Therefore, as mentioned above, an optimum suction time and an adequate quantity of additives must be determined for use in manufacturing shock absorbing materials. It is therefore imperative to measure porosities of erstwhile manufactured shock absorbing materials in order to ascertain whether an adequate ratio of voids has been formed.

Figure 22A:
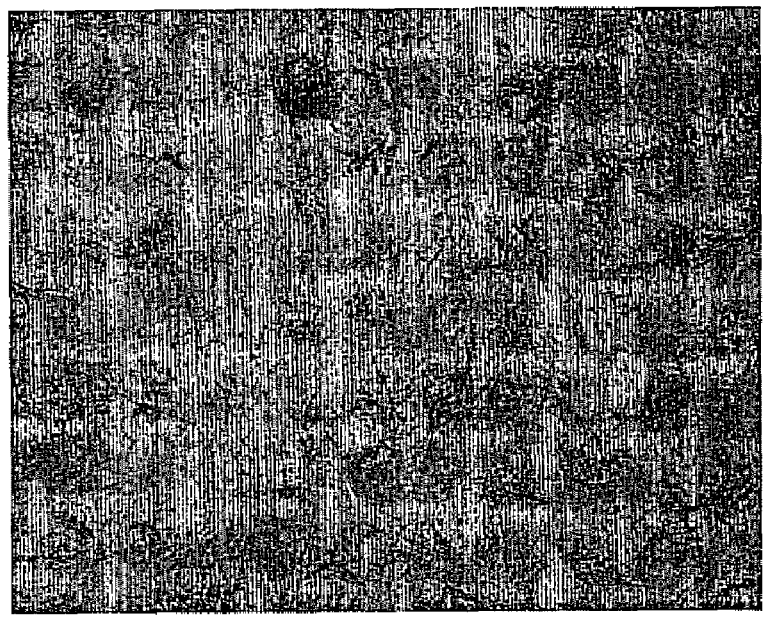
FIGS. 22a and 22b are surface photographs of shock absorbing materials manufactured in KOCC and KONP according to the present invention.
Figure 22B:
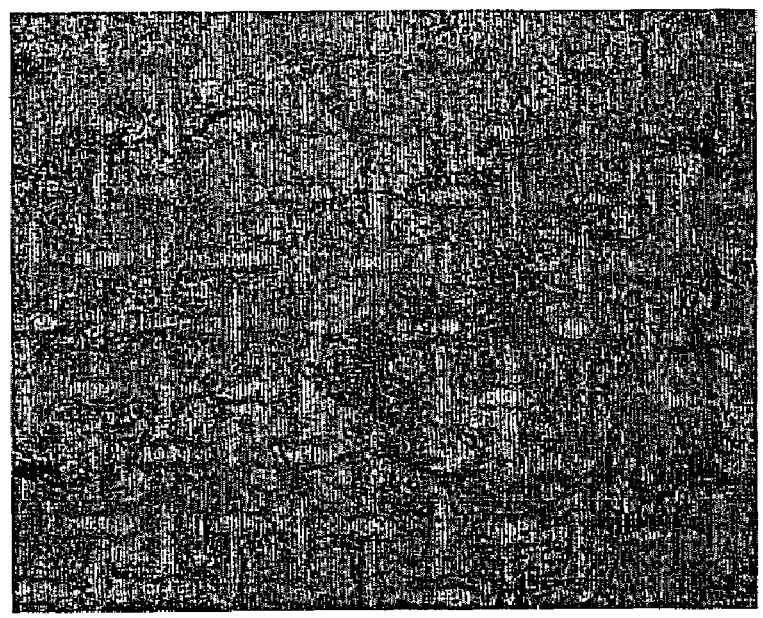

However, as illustrated in FIGS. 22a and 22b, separate apparatus must be used as it is difficult to anticipate the porosity just by observing the surface structure of the shock absorbing materials. On top of that, as it is very difficult to discern the shapes of voids formed inside the structure of the shock absorbing materials with the naked eye, a microscope and an image analyzer must be employed to measure the porosity. In order to observe the voids of the shock absorbing materials using a microscope, part of the structure of the shock absorbing materials must be first taken apart, epoxy resin was embedded thereon, the embedded structure was cut to pieces each having a thickness of approximately 20 μm, only the fiber is dyed with toludine blue of 1% concentration, and images were photographed by a microscope (×4 object lens) as illustrated in FIG. 23b. Images of photographed cross-sections of the shock absorbing materials were put into the image analyzer to automatically calculate a ratio occupied by spaces other than the fibers within a predetermined area, and then the porosity was calculated.

Figure 23A:
FIGS. 23a and 23b are cross-sectional photographs (×40) of shock absorbing materials according to the present invention.
Figure 23B:
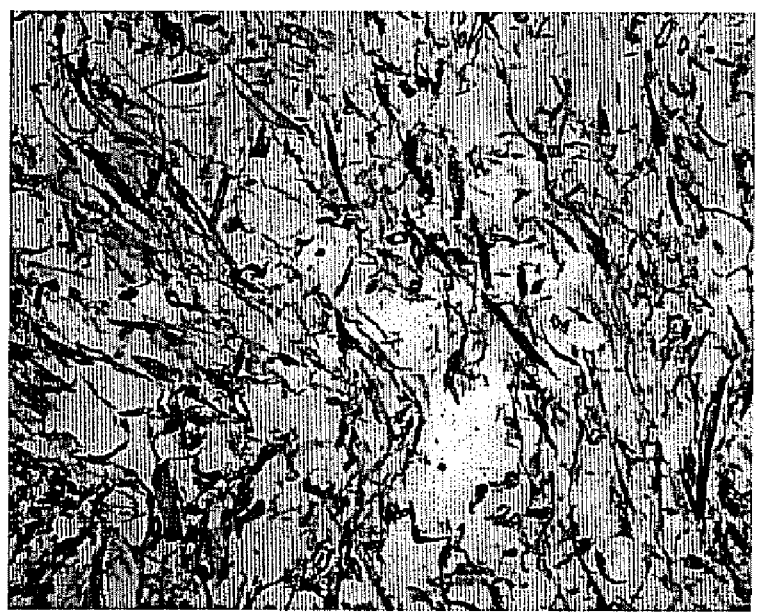
Figure 24:
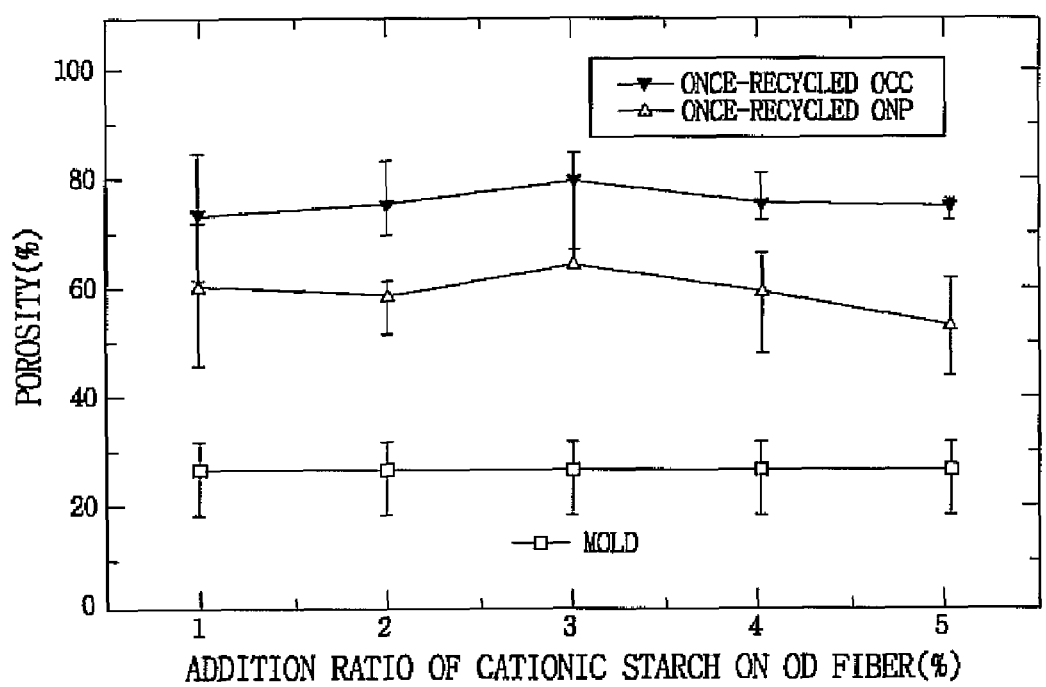
FIG. 24 is a graph illustrating changes of porosity in shock absorbing materials in relation to addition ratio of starch according to the present invention.

The following Table 7 explains that cross-sectional photographs like those in FIGS. 23a and 23b are used to calculate porosities of shock absorbing materials made of KOCC and KONP and those of pulp mold, and calculated results are shown by way of changes of porosities in response to addition ratio of cationic starch. FIG. 24 is a graph illustrating porosity changes of shock absorbing materials in relation to addition ratio of starch against KOCC, KONP and pulp mold.

TABLE 7

POROSITY CHANGES OF SHOCK ABSORBING MATERIALS
IN RESPONSE TO ADDITION RATIO OF STARCH

| Wastepaper[1] | | Cationic starch (%)* | | | | |
|---|---|---|---|---|---|---|
| | | 0 | 1 | 2 | 3 | 4 | 5 |
| KOCC | porosity (%) | | 73.25 | 75.28 | 79.55 | 75.58 | 74.74 |
| | S.D.[2] | | 7.67 | 4.20 | 6.61 | 3.61 | 1.23 |
| KONP | porosity (%) | | 59.82 | 58.24 | 64.10 | 59.07 | 52.71 |
| | S.D. | | 8.40 | 5.55 | 4.05 | 6.44 | 6.42 |
| Mold | porosity (%) | 26.36 | | | N/A | | |
| | S.D. | 5.02 | | | | | |

[1]Wastepaper means KOCC and KONP respectively.
[2]S.D. means standard deviation.
*Based on OD pulp weight.

Now, referring back to FIG. 20, there was no great change in densities of the shock absorbing materials when cationic starch of less than 5% against the total dry weight of wastepaper was added. This finding signifies that the addition of cationic starch has no great influence on the inner structure of the shock absorbing materials. The porosity calculation is none other than the index capable of quantitatively checking this (the addition of cationic starch having no great influence on the inner structure of the shock absorbing materials). In other words, apparent density and porosity of shock absorbing materials are closely related. As illustrated in FIG. 24, when cationic starch of less than 5% was added, porosities of shock absorbing materials made of KOCC and KONP showed no big changes. As mentioned in the result of the apparent density, it seems that, because the addition of cationic starch had no great influence on the densification of the inner structure of the shock absorbing materials, porosity was not greatly influenced. The cationic starch used as dry strength additives seems to function as a supplement to the interfiber hydrogen bonding in between the fibers comprising the shock absorbing materials.

One interesting fact was found from a graph of FIG. 24 showing the porosity changes. When porosities of shock absorbing materials made of KOCC and KONP were compared, the shock absorbing material made of KOCC contain much more voids than those made of KONP, which ascertains a result that the shock absorbing ability of shock absorbing material made of KOCC excels that of KONP. Because KOCC is manufactured with unbleached kraft pulp, individual fibers contain a considerably large quantity of lignin to thereby exercise a negative influence on interfiber bonds. Still worse, repetition of recycling of fibers entails hornification of fibers, which in turn decreases the fibrous bonding force. If the fibrous bonding force is lost in manufacturing shock absorbing materials, a large number of free spaces remain in the inner structure of the shock absorbing materials to give rise to an increased porosity. Meanwhile, KONP is composed of old magazine wastepaper and ONP, and most of the wastepaper consists of completely bleached chemical and mechanical pulps and weakly bleached newspaper wastepaper. In other words, this finding implies that a very large amount of lignin was removed in the course of bleaching process. As a result, KONP fibers retain a much more flexibility and a larger fibrous bonding force than those of KOCC fibers. The excellent bonding ability retained by KONP fibers serves to strengthen the physical properties of being bonded in between the fibers during the manufacturing process of shock absorbing materials, thereby leading to manufacture of shock absorbing materials having much smaller voids than those of KOCC. The same result can be also ascertained by a graph of FIG. 24.

Figure 25A:
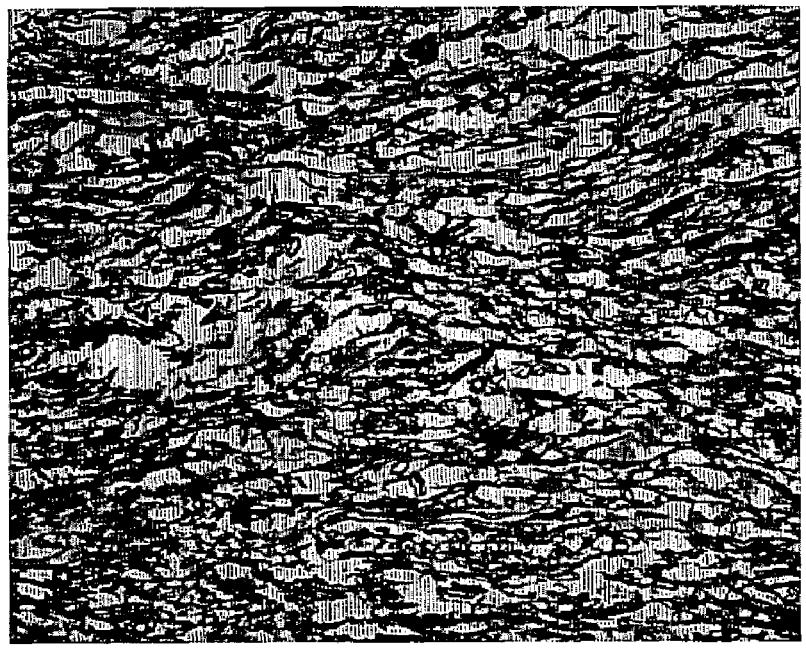
FIGS. 25a, 25b and 25c are cross-sectional photographs (×40) of a pulp mold and shock absorbing materials manufactured of KOCC and KONP according to the present invention.

It is imperative that environment-friendly shock absorbing materials made of wastepaper fibers show different physical properties than those of pulp mold. Particularly, if the environment-friendly shock absorbing materials made of wastepaper fibers do not have a much larger porosity than that of the pulp mold, a distinction between these two will spontaneously disappear. As illustrated in FIG. 24, shock absorbing materials made of KOCC and KONP showed porosity 3-4 times larger than that of the pulp mold. Although shock absorbing materials made of wastepaper is applied with vacuuming method free of press process, pulp mold is applied with a physical compression under a strong vacuum state such that fibers comprising the pulp mold are tightly adhered thereamong under this process. At the same time, moistures in the fibers are rapidly dried up at a very high temperature to embody a very high bonding force. In conclusion, as illustrated in FIG. 25, the rapid drying of moisture at a very high temperature leads to manufacture of pulp mold having a densely formed cross-section. The cross-section of the pulp mold hardly form free spaces in broad regions that are supposed to be formed in between fibers, resulting in generation of materials of a higher density. The porosity of the pulp mold is approximately 26%, which is lower than that of common aggregate (porosity of 30-40%). In order for the pulp mold to possess a shock absorbing effect, a forming mold is employed to form artificial gigantic spaces therein.

Figure 25B:
Figure 25C:
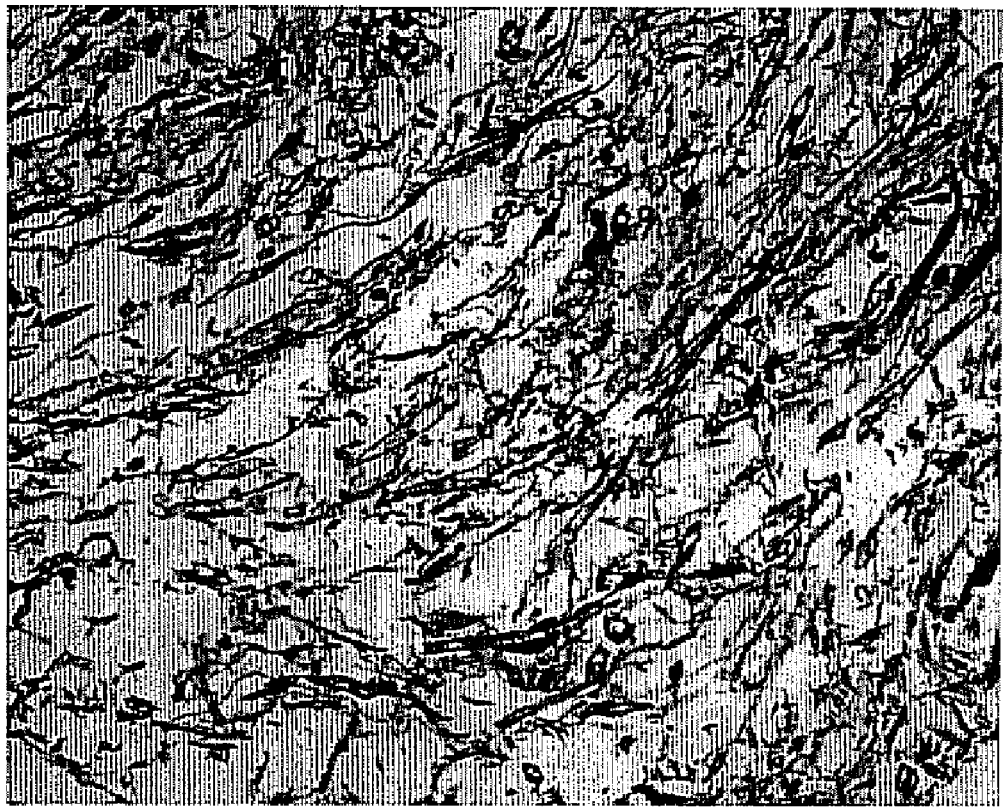

FIGS. 25b and 25c show cross-sectional photographs (×40) of shock absorbing materials manufactured of KOCC and KONP. It can be easily noticed from the photographs that free spaces covering a wide area are formed in between the bonded fibers unlike the pulp mold. These free spaces serve to absorb or alleviate external shocks. When compared with the cross-sections of shock absorbing materials made of KONP and KOCC, as is also ascertained by FIG. 24, the shock absorbing material made of KONP is formed with less number of free spaces, i.e., more densely than those of KOCC. This finding visually verifies that the KONP shock absorbing material lag far behind the KOCC shock absorbing material in terms of shock absorbing ability.

The higher porosity promotes the drainage speed during vacuuming, which greatly affects the drying cost. Lots of voids inside shock absorbing materials would speed up the moving speed of moistures during suction to enable to remove a large quantity of moistures with a short time of reduced pressure. The reduced drying time could reduce the manufacturing cost of shock absorbing materials such that formation of voids is a key factor in the manufacturing process of shock absorbing materials in terms of physical or economical aspect.

Tenth Embodiment

Brightness of Shock Absorbing Materials
Manufactured by Vacuum Forming Process

Styrofoam widely used as one of the shock absorbing materials is made in white color due to its inherent characteristic. However, the Styrofoam occupies a large space due to its volume expanded in the course of manufacturing process steps and has earned a notorious name called as "non-degradable material", such that Styrofoam may come to be regarded as one of the packing materials to be most avoided in the future.

OECD (Organization for Economic Cooperation and Development) countries are supposed to impose a heavy environment tax as much as weight of non-degradable material used for protection of contents of packed goods in short and medium terms, which would pose a considerable burden to exporting countries as the import prices will inevitably go up as much as the levied environment tax. It is imperative to develop environment-friendly shock absorbing materials with an excellent shock absorbing ability replacing the Styrofoam at early as possible for use in packing materials for export. At the same time, consumers must change the hitherto mind-set of placing great emphasis on colors or quality of shock absorbing materials used for packing of goods. A stereotyped idea of insisting on white color must be avoided and a new paradigm in view of environmental aspects must be applied to shock absorbing materials for packing of goods.

Typically, brightness of Styrofoam is 95 or more, which is much higher than that of KOCC or KONP shock absorbing material. As shown in the following Table 8, the KOCC shock absorbing material has a brightness of 13-16, which that of KONP shock absorbing material is 31-33.

TABLE 8

BRIGHTNESS OF SHOCK ABSORBING MATERIAL MADE OF WASTEPAPER

| Number | KONP top | KONP bottom | KOCC top | KOCC bottom | Milk carton top | Milk carton bottom | KOCC 50% + Milk carton 50% top | KOCC 50% + Milk carton 50% bottom | KONP 50% + Milk carton 50% top | KONP 50% + Milk carton 50% bottom |
|---|---|---|---|---|---|---|---|---|---|---|
| 1 | 30.96 | 32.40 | 13.12 | 14.52 | 63.29 | 68.12 | 28.46 | 28.34 | 31.65 | 36.89 |
| 2 | 31.86 | 32.95 | 14.33 | 13.97 | 71.13 | 68.10 | 27.50 | 28.64 | 40.08 | 37.29 |
| 3 | 30.27 | 33.71 | 15.13 | 15.80 | 69.92 | 71.52 | 29.68 | 26.20 | 41.57 | 38.66 |
| 4 | 32.12 | 33.20 | 15.01 | 16.42 | 67.12 | 72.50 | 30.52 | 30.33 | 38.36 | 38.21 |
| 5 | 30.87 | 31.75 | 14.82 | 15.01 | 65.94 | 69.82 | 29.48 | 31.50 | 36.39 | 41.25 |
| 6 | 31.57 | 30.98 | 13.89 | 15.79 | 67.67 | 67.43 | 27.55 | 28.67 | 34.35 | 42.38 |
| 7 | 32.01 | 31.59 | 15.82 | 15.89 | 66.40 | 67.54 | 27.12 | 29.24 | 35.25 | 36.78 |
| 8 | 30.98 | 32.91 | 14.51 | 16.02 | 57.28 | 68.33 | 25.66 | 29.65 | 38.66 | 38.69 |
| 9 | 30.18 | 33.65 | 14.58 | 14.86 | 64.58 | 70.31 | 25.94 | 30.77 | 37.58 | 36.21 |
| 10 | 32.11 | 33.12 | 14.61 | 15.92 | 68.44 | 64.65 | 30.10 | 29.60 | 37.68 | 39.24 |
| Average | 31.33 | 32.70 | 14.61 | 15.48 | 66.67 | 68.90 | 28.23 | 29.41 | 37.29 | 38.38 |
| S.D.[1] | 0.66 | 0.72 | 0.39 | 0.58 | 2.11 | 1.48 | 1.45 | 0.85 | 1.88 | 1.47 |

[1]S.D. means standard deviation.

The KOCC shock absorbing material composed of unbleached kraft pulp containing lignin has brightness much lower than that of OMP and ONP shock absorbing materials. It is very difficult to obtain brightness similar to or on a par with that of Styrofoam even if KONP and KOCC are mixed with milk carton wastepaper having brightness of approximately 67 to manufacture shock absorbing materials. Obnoxious bleaching chemicals (NaOH, $ClO_2$, $Cl_2$, $H_2O_2$, $O_3$) must be used to attain brightness similar to or on a par with that of Styrofoam through processing KOCC or KONP fibers with sophisticated bleaching method, but usage of these chemicals would have to shoulder polluted water processing burden. If shock absorbing materials made under these circumstances are dumped into soils or rivers, it would be a logical jump in reasoning if one aspect of "biodegradable shock absorbing materials" is highlighted by emphasizing that the dumped shock absorbing materials were essentially made of biodegradable cellulose. This would entail an antinomic result of water pollution taking roots where the shock absorbing materials have departed, because strong bleaching processes must be performed for manufacturing environment-friendly shock absorbing materials. It is therefore imperative to limit chemicals for manufacturing the environment-friendly shock absorbing materials to a maximum considering the aspect of the environmental benefit, and to manufacture the materials only with the mechanical processes. It can be said that shock absorbing materials made of KOCC and KONP are genuine environment-friendly shock absorbing materials in light of aspects of environmental benefit.

Eleventh Embodiment

Drying Speed of Shock Absorbing Materials Manufactured by Vacuum Forming Process The amount of moistures contained in shock absorbing material right after the vacuum dehydration has a decisive influence on the drying time. Prolonged drying time would entail an increase in manufacturing cost, which in turn becomes a burden on consumers using shock absorbing materials in terms of increase in logistics cost. Therefore, it is important to remove as much moistures as possible during the vacuum hydration process but it should not be overlooked that suction times are lengthened. If the suction time is lengthened, densification of shock absorbing materials is further advanced to give rise to a reason of decreasing the shock absorbing ability. It is therefore important to reduce the manufacturing cost as much as possible by determining an adequate suction time.

Figure 26:
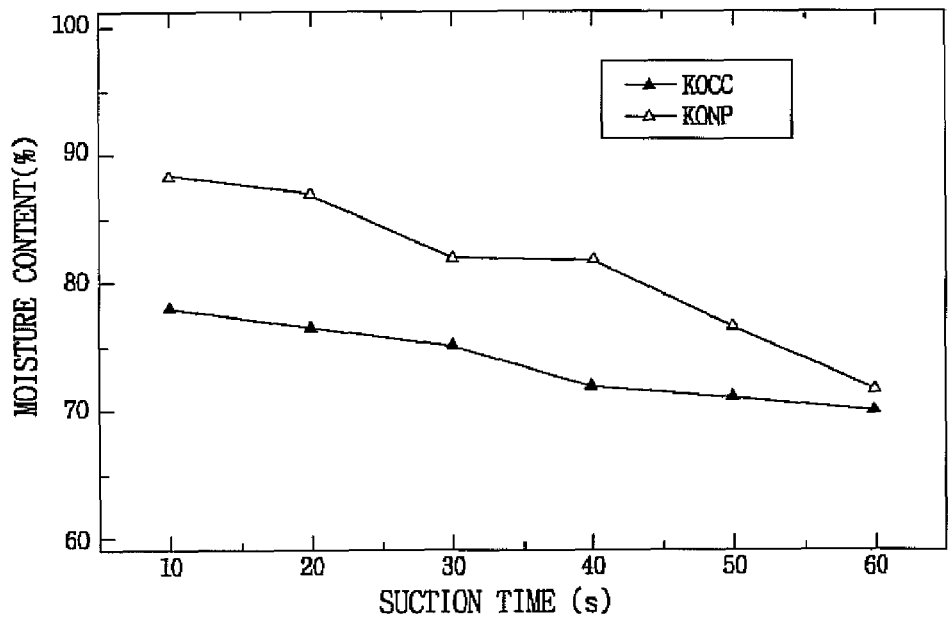
FIG. 26 is a graph illustrating changes of moisture contents in shock absorbing materials in relation to suction time according to the present invention.

The following Table 9 and FIG. 26 show an influence exerted on moisture contents of shock absorbing materials right before the suction time when the shock absorbing materials are made using KOCC and KONP.

TABLE 9

CHANGES OF MOISTURE CONTENTS OF SHOCK ABSORBING MATERIALS IN RESPONSE TO SUCTION TIMES

| Suction time(sec) | KOCC | KONP |
|---|---|---|
| 10 | 77.9 | 88.106 |
| 20 | 76.35 | 86.7 |
| 30 | 74.975 | 81.85 |

TABLE 9-continued

CHANGES OF MOISTURE CONTENTS OF SHOCK ABSORBING
MATERIALS IN RESPONSE TO SUCTION TIMES

| Suction time(sec) | KOCC | KONP |
|---|---|---|
| 40 | 71.65 | 81.641 |
| 50 | 70.85 | 76.426 |
| 60 | 69.885 | 71.6 |

Referring to FIG. 26, as the suction time is lengthened during the vacuuming process, shock absorbing materials made of KOCC and KONP all decreased in the amount of moisture contents. However, shock absorbing material made of KONP showed inclusion of more moistures than those of KOCC. This is because the type of wastepaper made of KONP comprised of lignin-removed bleached OMP and ONP such that reaction with—OH of water molecules is large. Meanwhile, KOCC is composed of unbleached kraft pulp containing a large amount of lignin, such that KOCC has much lower possibility of being coupled with water molecules by lignin substance encompassing cellulose fiber than that of KONP. As a result, even if the same suction time is applied, KONP contains much more moisture than KOCC. It was ascertained by FIG. 26 that a shock absorbing material made of KOCC is more effective in reducing the drying cost than that of KONP in terms of economic point of view.

Figure 27:
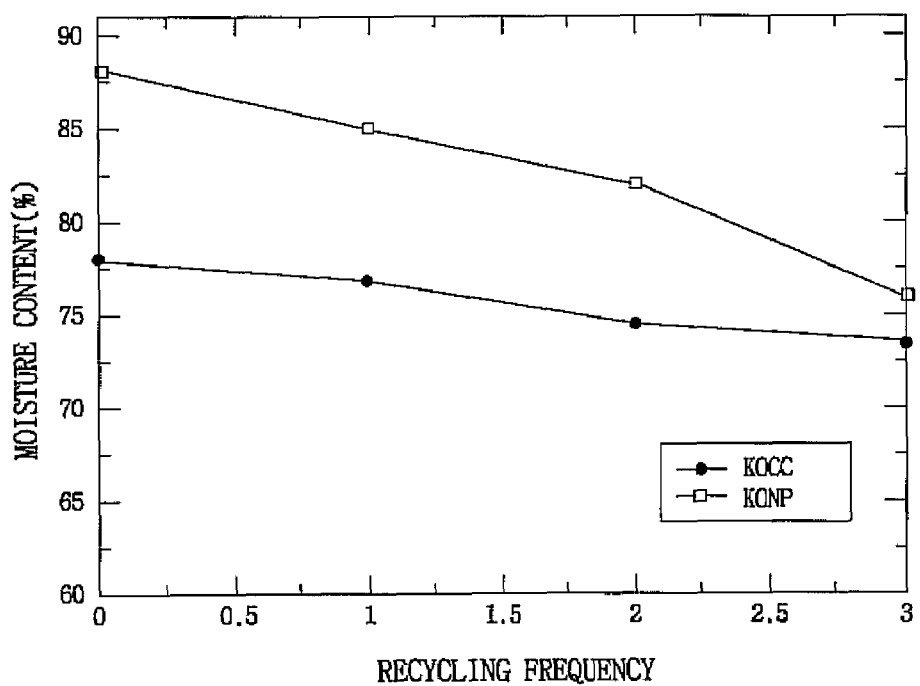
FIG. 27 is a graph illustrating changes of moisture contents in shock absorbing materials in relation to recycling frequency of wastepaper according to the present invention.

The following Table 10 and FIG. 27 show measurement results of moisture contents (%) contained by shock absorbing materials made of KOCC and KONP before they enter into the drying process step following the vacuum forming process step. The tests also tried to find out what influences the repeated recycling has on the moisture contents.

TABLE 10

CHANGES OF MOISTURE CONTENTS OF SHOCK ABSORBING
MATERIALS IN RESPONSE TO RECYCLING FREQUENCY

| | Wastepaper | Recycling frequency | | | |
|---|---|---|---|---|---|
| | | 0 | 1 | 2 | 3 |
| Moisture Content (%) | KOCC (10 sec.)[1] | 77.900 | 76.788 | 74.850 | 73.500 |
| | KNOP (10 sec.) | 88.106 | 85.000 | 82000 | 75.962 |

[1] Suction time

As noted above, when there was no recycling at all, shock absorbing material made of KOCC contained much less moisture than that of KONP. When wastepaper was repeatedly used for manufacturing shock absorbing materials, the moisture contents varied according to the recycling frequency. In other words, the amount of moisture contents decreased as recycling was repeated for both shock absorbing materials made of KOCC and KONP. The KONP excelled the KOCC in terms of decreased level, and contained more moisture regardless of recycling frequency. As mentioned above, KONP mainly composed of bleached pulp is greatly affected by hornification resultant from recycling. As the hornification progresses further, the combining ability with water decreases to lead to reduced amount of moisture contained by shock absorbing materials. Meanwhile, KOCC composed of unbleached pulp experiences a slower hornification over KONP due to lignin to lose the combining ability with water at a piecemeal basis. As a result this is the reason why curvature of KOCC is much gentler than that of KONP.

In conclusion, the shock absorbing material made of KOCC contain less moisture than that of KONP in terms of moisture contents right before drying. This finding shows that the shock absorbing material of KOCC can dry at a shorter time than that of KONP when they enter into the drying process. Therefore, it was ascertained by this finding that the KOCC is a much better raw material in terms of overall manufacturing aspects.

Twelfth Embodiment

Manufacture of Shock Absorbing Materials Using De-Inked Pulp

There are two types of wastepaper used for manufacturing shock absorbing materials i.e., KOCC and KONP. Although there is no big problem in KOCC which has a much smaller area printed by technology such as photogravure or screen printing method than that of common printing paper, the KONP, being covered on both sides thereof with ink, can be affected in physical properties if shock absorbing materials are made with ink not removed. In order to find out if there is any influence by ink, the collected KOCC was de-inked by a de-inking floatation method to manufacture shock absorbing materials. The de-inking was performed in such a manner that KONP suspension is made to a weak alkaline state, mixed with surfactants and disintegrated, where the ink-laden bubbles are made to float in a flotation cell.

The following Table 11 shows measured results of fiber length of KONP fibers and fines contents of less than 0.2 mm in diameter. The length-weighted mean fiber length of the de-inked pulp (DIP) was 0.71 mm, which is lower than 1.28 mm of KOCC and 1.01 mm of KONP when the length-weighted mean fiber lengths were compared excluding influences by the fine contents. On top of that, approximately 31% of the fine contents was found in the DIP, which is a higher than KOCC of 23% and KONP of 21%. Typically, recycling effect with regard to fiber length, fiber coarseness and fiber length distribution are of no significance in paper manufacturing using wastepaper. However, if shock absorbing materials are made using DIP of short fiber lengths and containing a large amount of fines contents, there would be lots of problems involved in vacuum dehydration.

TABLE 11

FIBER LENGTH DISTRIBUTION OF WASTEPAPER FIBERS

| | Arithmetic mean fiber length (mm) | Length-weighted mean fiber length (mm) | Weight-weighted mean fiber length (mm) | Fines content(%) (<0.2 mm) |
|---|---|---|---|---|
| KOCC | 0.68 | 1.28 | 1.94 | 23.33 |
| KONP | 0.58 | 1.01 | 1.59 | 21.12 |
| DIP | 0.42 | 0.71 | 1.03 | 31 |

When DIP suspension was actually put into a vacuum forming box and vacuum dehydrated, it took lots of time (approximately 300 seconds) to vacuum-dehydrate the DIP unlike the KOCC and KONP. It took approximately 10 seconds to remove the excessive water containing in the pulp suspension for KOCC and KONP, but it took more than 30 times to dehydrate that amount of water for formation in case of DIP. Therefore, it was discriminated that manufacturing processes would have been lengthened, and more power would have been consumed for vacuum dehydration if KONP were made into DIP and vacuum-formed. The DIP further contains a considerable amount of short fiber and fine contents to supposedly exert a great influence on rise in the manufacturing cost of short absorbing materials.

In a nutshell, manufacturing the DIP for manufacturing shock absorbing materials would result in a tremendous increase in manufacturing cost because additional cost for de-inking, drainage and drying processes would be incurred. Besides, use of chemicals for de-inking would incur a further cost for disposing of the wastewater, which is adverse to an initial object of manufacturing environment-friendly shock absorbing materials replacing the Styrofoam. After all, the DIP is discriminated to be inadequate due to occurrence of aggravated loads and additional costs in the course of manufacturing processes.

Meanwhile, what has been described above includes examples of the present invention. It is, of course, not possible to describe every conceivable combination of components or methodologies for purposes of describing the present invention, but one of ordinary skill in the art can recognize that many further combinations and permutations of the present invention are possible. Accordingly, the present invention is intended to embrace all such alterations, modifications and variations that fall within the spirit and scope of the appended claims. Furthermore, to the extent that the term "includes", "include" or "including" is ever used in either the detailed description or the claims, such term is intended to be inclusive in a manner similar to the term "comprising" as "comprising" is interpreted when employed as a transitional word in a claim.

As apparent from the foregoing, in accordance with the object of the present invention, the method for manufacturing wastepaper shock absorbing material using a vacuum forming principle comprises the steps of: disintegrating wastepaper selected from at least one or more of Korea Old Corrugated Containers (KOCC), Korea Old Newspaper (KONP) and milk cartons, using a blender; diluting the disintegrated wastepaper to manufacture pulp suspension; mixing the pulp suspension with cationic starch; vacuum-dehydrating the pulp cationic starch mixed with the pulp suspension to a dual direction using a vacuum former capable of dual vacuuming to manufacture a shock absorbing material; drying the shock absorbing material; and performing a surface sizing process on a surface of the dried shock absorbing material.

There is an advantage in the shock absorbing materials according to the present invention thus described in that a shock absorbing material having a remarkably low elastic modulus and density can be effectively manufactured without recourse to the conventional press process performed by a press plate.

The manufacturing principle of shock absorbing materials according to the present invention has a striking difference from that of the conventional pulp mold manufacturing method in that there is no need of press process performed by a hot press plate after inputting wastepaper suspension into a forming box. The present invention is to vacuum-dehydrate pulp suspension to a dual direction, thereby enabling the shock absorbing materials to have a large bulky structure (a state of low density). There is another advantage in that once water is removed from an inner structure of the shock absorbing materials through the dual-vacuuming, vacuum-dehydrated shock absorbing materials can limit an occurrence of interfiber bonds to a maximum, thereby enabling to obtain a large number of voids therein.

Therefore, regions where the interfiber bonds are limited are to form a fiber network, and these regions remain to be a large number of small voids inside the structure of the shock absorbing materials, which in turn makes physical properties excellent, the physical properties including a drying rate, a brightness, an apparent density, a compressive strength, a restoring ratio, an elastic modulus and a porosity, by which external shocks, vibration or noise can be effectively absorbed.

What is claimed is:

1. A method for manufacturing a wastepaper shock absorbing material using a vacuum forming principle, the method comprising:
   disintegrating wastepaper selected from at least one of old corrugated containers, old newspapers and milk cartons;
   diluting the disintegrated wastepaper to form a pulp suspension;
   mixing the pulp suspension with a cationic starch to form a mixture;
   vacuuming the mixture by applying a first vacuum in a first direction and a second vacuum in a second direction in a vacuum former to vacuum-dehydrate the mixture and provide a shock absorbing material, wherein the first direction is substantially opposite to the second direction;
   drying the shock absorbing material; and
   performing a surface sizing process on a surface of the shock absorbing material.

2. The method of claim 1, wherein the vacuum former comprises a rectangular shock absorbing material forming box, a circular shock absorbing material forming tube, a vacuum pump for drainage, a control box and a drainage apparatus.

3. The method of claim 2, wherein an elastic modulus of the wastepaper shock absorbing material is within a first range of approximately 150kPa to 700 kPa and wherein a density of the wastepaper shock absorbing material is within a second range of approximately 0.12 g/cm3 to 0.17 g/cm3.

4. The method of claim 1, wherein the vacuuming is performed within 10 to 60 seconds.

5. The method of claim 4, wherein an elastic modulus of the wastepaper shock absorbing material is within a first range of approximately 150 kPa to 700 kPa and wherein a density of the wastepaper shock absorbing material is within a second range of approximately 0.12 g/cm3 to 0.17 g/cm3.

6. The method of claim 1, wherein a weight of the milk cartons is within a range of approximately 20% to 80% of a total weight of a wastepaper specimen.

7. The method of claim 1, wherein a weight of the cationic starch is approximately 4% to 5% of a total dry weight of the wastepaper.

8. The method of claim 1, wherein the old corrugated containers or the old newspapers are recycled at least once.

9. The method of claim 1, wherein an elastic modulus of the wastepaper shock absorbing material is within a first range of approximately 150 kPa to 700 kPa and wherein a density of the wastepaper shock absorbing material is within a second range of approximately 0.12 g/cm3 to 0.17 g/cm3.

10. A wastepaper shock absorbing material having an elastic modulus within a first range of approximately 150 kPa to 700 kPa and a density within a second range of approximately 0.12 g/cm3 to 0.17 g/cm3, wherein the wastepaper shock absorbing material is produced by a method comprising:
    disintegrating wastepaper selected from at least one of old corrugated containers, old newspapers and milk cartons;
    diluting the disintegrated wastepaper to form a pulp suspension;
    mixing the pulp suspension with a cationic starch to form a mixture;
    vacuuming the mixture by applying a first vacuum in a first direction and a second vacuum in a second direction in a vacuum former to vacuum-dehydrate the mixture and provide a shock absorbing material, wherein the first direction is substantially opposite to the second direction;

drying the shock absorbing material; and performing a surface sizing process on a surface of the shock absorbing material.

11. The wastepaper shock absorbing material of claim 10, wherein the vacuum former comprises a rectangular shock absorbing material forming box, a circular shock absorbing material forming tube, a vacuum pump for drainage, a control box and a drainage apparatus.

12. The wastepaper shock absorbing material of claim 10, wherein the vacuuming is performed within 10 to 60 seconds.

13. The wastepaper shock absorbing material of claim 10, wherein a weight of the milk cartons is within a third range of approximately 20% to 80% of a total weight of a wastepaper specimen.

14. The wastepaper shock absorbing material of claim 10, wherein a weight of the cationic starch is approximately 4% to 5% of a total dry weight of the wastepaper.

15. The wastepaper shock absorbing material of claim 10, wherein the old corrugated containers or the old newspapers are recycled at least once.

* * * * *